United States Patent
Baker et al.

(10) Patent No.: US 6,651,102 B2
(45) Date of Patent: *Nov. 18, 2003

(54) SYSTEMS AND METHODS FOR GENERAL PURPOSE DATA MODIFICATION

(75) Inventors: Peter D. Baker, Aliso Viejo, CA (US); Karen Neal, Los Angeles, CA (US)

(73) Assignee: NB Networks, Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/272,471

(22) Filed: Oct. 15, 2002

(65) Prior Publication Data

US 2003/0177254 A1 Sep. 18, 2003

Related U.S. Application Data

(63) Continuation-in-part of application No. 09/898,852, filed on Jul. 3, 2001, now Pat. No. 6,493,761, which is a continuation-in-part of application No. 09/113,704, filed on Jul. 10, 1998, now Pat. No. 6,266,700, which is a continuation of application No. 09/080,325, filed on May 15, 1998, now Pat. No. 6,000,041, which is a continuation of application No. 08/888,875, filed on Jul. 7, 1997, now Pat. No. 5,781,729, which is a continuation of application No. 08/575,506, filed on Dec. 20, 1995, now Pat. No. 5,793,954.

(51) Int. Cl.[7] .......................... G06F 15/16; H04L 12/28
(52) U.S. Cl. ..................... 709/230; 709/220; 709/223; 709/224; 709/250; 370/401
(58) Field of Search ................... 709/200–203, 709/213–214, 220, 223–224, 227–230, 249–250; 370/400–401

(56) References Cited

U.S. PATENT DOCUMENTS

| | | | | |
|---|---|---|---|---|
| 5,121,342 A | * | 6/1992 | Szymborski et al. | 709/224 |
| 5,515,513 A | * | 5/1996 | Metzger et al. | 370/401 |
| 5,727,149 A | * | 3/1998 | Hirata et al. | 709/250 |
| 5,764,899 A | * | 6/1998 | Eggleston et al. | 709/203 |
| 5,796,954 A | * | 8/1998 | Hanif et al. | 709/230 |
| 5,826,030 A | * | 10/1998 | Hebert | 709/220 |
| 6,000,041 A | * | 12/1999 | Baker et al. | 714/39 |
| 6,266,700 B1 | * | 7/2001 | Baker et al. | 709/230 |
| 6,493,761 B1 | * | 12/2002 | Baker et al. | 709/230 |

* cited by examiner

Primary Examiner—Bharat Barot
(74) Attorney, Agent, or Firm—Orrick, Herrington & Sutcliffe LLP

(57) ABSTRACT

Embodiments of the invention provide a general-purpose data modification system and methods of use. A common system is used for modifying any data composed of interrelated data structures similar to the protocols found in network frames. A common logic control module is configured to perform any number of data modification operations, based on programmably configurable protocol descriptions defining the data modification operations.

24 Claims, 11 Drawing Sheets

*Fig. 4*

| InitData PROTOCOL CONTROL RECORD ||||||
|---|---|---|---|---|---|
| PROTOCOL NAME | NUMBITS | NUMFIELDS | PAD DATA | FIELDS | IS_BLOCK |
| INIT_DATA PROTOCOL | 32 | 1 | 0 | FIGURE 4a | TRUE |

*Fig. 4a*

| InitData PROTOCOL FIELD SUB-RECORDS |||||||||||
|---|---|---|---|---|---|---|---|---|---|---|
| INDEX | FIELD NAME | BIT OFFSET | BIT LENGTH | LEFT SHIFT | RIGHT SHIFT | OUTPUT BIT OFFSET | OUTPUT LEFT SHIFT | OUTPUT RIGHT SHIFT | VARY STRUCTURE | FILTER STRUCTURE | FORMAT |
| 0 | FIELD 0 | 0 | 32 | 0 | 0 | 0 | 0 | 0 | FIGURE 4b | [NONE] | HEX |

*Fig. 4b*

| InitData PROTOCOL FIELD 0 VARY OBJECT ARRAY ||||||||||||
|---|---|---|---|---|---|---|---|---|---|---|---|
| INDEX | TYPE | OPERAND | LOOPS | DIRECT | FIRST_IDX | LAST_IDX | BOX | [SHIFT] | [OFFSET] | [IDX] | [IVAL] | [ARRAY8] |
| 0 | SET_INIT_8 | 0 | 0 | 0 | 0 | 0 | 0 | [NONE] | [NONE] | [NONE] | [NONE] | [NONE] |
| 1 | LOOP | 0 | 18 | 0 | 2 | 6 | 0 | [NONE] | [NONE] | [NONE] | [NONE] | [NONE] |
| 2 | SET_INIT1_32 | 0 | 0 | 0 | 0 | 0 | 0 | [NONE] | [NONE] | [NONE] | [NONE] | [NONE] |
| 3 | LOOP | 0 | 4 | 0 | 4 | 5 | 0 | [NONE] | [NONE] | [NONE] | [NONE] | [NONE] |
| 4 | ORARRAY8_SHIFTVAL_32 | 0 | 0 | 1 | 0 | 0 | 0 | 8 | [NONE] | [NONE] | [NONE] | INITIAL ARRAY |
| 5 | INCMOD_8 | 0 | 0 | 0 | 0 | 0 | 0 | [NONE] | [NONE] | [NONE] | [NONE] | [NONE] |
| 6 | SETARRAYIDXXOR_32 | 0 | 0 | 0 | 0 | 0 | 0 | [NONE] | [NONE] | [NONE] | [NONE] | [NONE] |

*Fig. 5*

| InitPBox PROTOCOL CONTROL RECORD ||||||
|---|---|---|---|---|---|
| PROTOCOL NAME | NUMBITS | NUMFIELDS | PAD DATA | FIELDS | IS_BLOCK |
| InitPBox PROTOCOL | 32 | 1 | 0 | FIGURE 5a | TRUE |

*Fig. 5a*

| InitPBox PROTOCOL FIELD SUB-RECORDS |||||||||||
|---|---|---|---|---|---|---|---|---|---|---|
| INDEX | FIELD NAME | BIT OFFSET | BIT LENGTH | LEFT SHIFT | RIGHT SHIFT | OUTPUT BIT OFFSET | OUTPUT LEFT SHIFT | OUTPUT RIGHT SHIFT | VARY STRUCTURE | FILTER STRUCTURE | FORMAT |
| 0 | FIELD 0 | 0 | 32 | 0 | 0 | 0 | 0 | 0 | FIGURE 5b | [NONE] | HEX |

*Fig. 5b*

| InitPBox PROTOCOL FIELD 0 VARY OBJECT ARRAY |||||||||||||
|---|---|---|---|---|---|---|---|---|---|---|---|---|
| INDEX | TYPE | OPERAND | LOOPS | DIRECT | FIRST_IDX | LAST_IDX | BOX | [SHIFT] | [OFFSET] | [IDX] | [IVAL] | [ARRAYB] |
| 0 | SET_INIT1_32 | 0 | 0 | 0 | 0 | 0 | 0 | [NONE] | [NONE] | [NONE] | 0 | [NONE] |
| 1 | SET_INIT2_32 | 0 | 0 | 0 | 0 | 0 | 0 | [NONE] | [NONE] | [NONE] | 0 | [NONE] |
| 2 | LOOP | 0 | 16 | 0 | 3 | 9 | 0 | [NONE] | [NONE] | [NONE] | [NONE] | [NONE] |
| 3 | XORARRAY32MEM | 0 | 0 | 0 | 0 | 0 | *P[0] | [NONE] | [NONE] | [NONE] | [NONE] | [NONE] |
| 4 | ARRAYCOMPUTEID XSHIFT32VAL | 0 | 0 | 0 | 0 | 0 | *S[0] | 24 | [NONE] | [NONE] | [NONE] | [NONE] |
| 5 | ADDARRAY_COMPU TEIDX32VAL | 0 | 0 | 0 | 0 | 0 | *S[1] | 16 | [NONE] | [NONE] | [NONE] | [NONE] |
| 6 | XORARRAYCOMPU TEIDX32VAL | 0 | 0 | 0 | 0 | 0 | *S[2] | 8 | [NONE] | [NONE] | [NONE] | [NONE] |
| 7 | ADDARRAY_COMPU TEIDX32VAL | 0 | 0 | 0 | 0 | 0 | *S[3] | [NONE] | [NONE] | [NONE] | [NONE] | [NONE] |
| 8 | XORVAL_32MEM1 | 0 | 0 | 0 | 0 | 0 | 0 | [NONE] | [NONE] | [NONE] | [NONE] | [NONE] |
| 9 | XCHANGE_32 | 0 | 0 | 0 | 0 | 0 | 0 | [NONE] | [NONE] | [NONE] | [NONE] | [NONE] |
| 10 | XCHANGE_32 | 0 | 0 | 0 | 0 | 0 | 0 | [NONE] | [NONE] | [NONE] | [NONE] | [NONE] |
| 11 | XORARRAY32MEM1 | 0 | 0 | 0 | 0 | 0 | *P[0] | [NONE] | [NONE] | [NONE] | [NONE] | [NONE] |
| 12 | XORARRAY32MEM | 0 | 0 | 0 | 0 | 0 | *P[0] | [NONE] | [NONE] | [NONE] | [NONE] | [NONE] |
| 13 | SETARRAYIDX_32 | 0 | 0 | 0 | 0 | 0 | *P | [NONE] | [NONE] | [NONE] | [NONE] | [NONE] |
| 14 | SETARRAYIDX1_32 | 0 | 0 | 0 | 0 | 0 | *P | [NONE] | [NONE] | [NONE] | [NONE] | [NONE] |

*Fig. 6*

| InitSBox PROTOCOL CONTROL RECORD | | | | | |
|---|---|---|---|---|---|
| PROTOCOL NAME | NUMBITS | NUMFIELDS | PAD DATA | FIELDS | IS_BLOCK |
| InitSBox PROTOCOL | 32 | 1 | 0 | FIGURE 6a | TRUE |

*Fig. 6a*

| InitSBox PROTOCOL FIELD SUB-RECORDS | | | | | | | | | | | |
|---|---|---|---|---|---|---|---|---|---|---|---|
| INDEX | FIELD NAME | BIT OFFSET | BIT LENGTH | LEFT SHIFT | RIGHT SHIFT | OUTPUT BIT OFFSET | OUTPUT LEFT SHIFT | OUTPUT RIGHT SHIFT | VARY STRUCTURE | FILTER STRUCTURE | FORMAT |
| 0 | FIELD 0 | 0 | 32 | 0 | 0 | 0 | 0 | 0 | FIGURE 6b | [NONE] | HEX |

*Fig. 6b*

| InitSBox PROTOCOL FIELD 0 VARY OBJECT ARRAY | | | | | | | | | | | | |
|---|---|---|---|---|---|---|---|---|---|---|---|---|
| INDEX | TYPE | OPERAND | LOOPS | DIRECT | FIRST_IDX | LAST_IDX | BOX | [SHIFT] | [OFFSET] | [IDX] | [IVAL] | [ARRAY8] |
| 0 | LOOP | 0 | 16 | 0 | 1 | 7 | 0 | [NONE] | [NONE] | [NONE] | [NONE] | [NONE] |
| 1 | XORARRAY32MEM | 0 | 0 | 0 | 0 | 0 | *P[0] | [NONE] | [NONE] | [NONE] | [NONE] | [NONE] |
| 2 | ARRAYCOMPUTEID XSHIFT_32VAL | 0 | 0 | 0 | 0 | 0 | *S[0] | 24 | [NONE] | [NONE] | [NONE] | [NONE] |
| 3 | ADDARRAY_COMPU TEIDX32VAL | 0 | 0 | 0 | 0 | 0 | *S[1] | 16 | [NONE] | [NONE] | [NONE] | [NONE] |
| 4 | XORARRAY_COMPU TEIDX32VAL | 0 | 0 | 0 | 0 | 0 | *S[2] | 8 | [NONE] | [NONE] | [NONE] | [NONE] |
| 5 | ADDARRAY_COMPU TEIDX32VAL | 0 | 0 | 0 | 0 | 0 | *S[3] | [NONE] | [NONE] | [NONE] | [NONE] | [NONE] |
| 6 | XORVAL_32MEM1 | 0 | 0 | 0 | 0 | 0 | 0 | [NONE] | [NONE] | [NONE] | [NONE] | [NONE] |
| 7 | XCHANGE_32 | 0 | 0 | 0 | 0 | 0 | 0 | [NONE] | [NONE] | [NONE] | [NONE] | [NONE] |
| 8 | XCHANGE_32 | 0 | 0 | 0 | 0 | 0 | 0 | [NONE] | [NONE] | [NONE] | [NONE] | [NONE] |
| 9 | XORARRAY32MEM1 | 0 | 0 | 0 | 0 | 0 | *P[0] | [NONE] | [NONE] | [NONE] | [NONE] | [NONE] |
| 10 | XORARRAY32MEM | 0 | 0 | 0 | 0 | 0 | *P[0] | [NONE] | [NONE] | [NONE] | [NONE] | [NONE] |
| 11 | SETARRAYIDX_32 | 0 | 0 | 0 | 0 | 0 | *S | [NONE] | [NONE] | [NONE] | [NONE] | [NONE] |
| 12 | SETARRAYIDX1_32 | 0 | 0 | 0 | 0 | 0 | *S | [NONE] | [NONE] | [NONE] | [NONE] | [NONE] |

*Fig. 7*

| VARYDATA PROTOCOL CONTROL RECORD | | | | | |
|---|---|---|---|---|---|
| PROTOCOL NAME | NUMBITS | NUMFIELDS | PAD DATA | FIELDS | IS_BLOCK |
| VARYDATA PROTOCOL | 64 | 2 | 0 | FIGURE 7a | TRUE |

*Fig. 7a*

| VARYDATA PROTOCOL FIELD SUB-RECORDS | | | | | | | | | | | |
|---|---|---|---|---|---|---|---|---|---|---|---|
| INDEX | FIELD NAME | BIT OFFSET | BIT LENGTH | LEFT SHIFT | RIGHT SHIFT | OUTPUT BIT OFFSET | OUTPUT LEFT SHIFT | OUTPUT RIGHT SHIFT | VARY STRUCTURE | FILTER STRUCTURE | FORMAT |
| 0 | FIELD 0 | 0 | 32 | 0 | 0 | 0 | 0 | 0 | FIGURE 7b | [NONE] | HEX |
| 1 | FIELD 1 | 32 | 32 | 0 | 0 | 32 | 0 | 0 | [NONE] | [NONE] | HEX |

*Fig. 7b*

| VARYDATA PROTOCOL FIELD 0 VARY OBJECT ARRAY | | | | | | | | | | | | |
|---|---|---|---|---|---|---|---|---|---|---|---|---|
| INDEX | TYPE | OPERAND | LOOPS | DIRECT | FIRST_IDX | LAST_IDX | BOX | [SHIFT] | [OFFSET] | [IDX] | [IVAL] | [ARRAY8] |
| 0 | LOOP | 0 | 16 | 0 | 1 | 7 | 0 | [NONE] | [NONE] | [NONE] | [NONE] | [NONE] |
| 1 | XORARRAY32MEM | 0 | 0 | 0 | 0 | 0 | *P[0] | [NONE] | [NONE] | [NONE] | [NONE] | [NONE] |
| 2 | ARRAYCOMPUTEID XSHIFT_32VAL | 0 | 0 | 0 | 0 | 0 | *S[0] | 24 | [NONE] | [NONE] | [NONE] | [NONE] |
| 3 | ADDARRAY_COMPU TEIDX32VAL | 0 | 0 | 0 | 0 | 0 | *S[1] | 16 | [NONE] | [NONE] | [NONE] | [NONE] |
| 4 | XORARRAY_COMPU TEIDX32VAL | 0 | 0 | 0 | 0 | 0 | *S[2] | 8 | [NONE] | [NONE] | [NONE] | [NONE] |
| 5 | ADDARRAY_COMPU TEIDX32VAL | 0 | 0 | 0 | 0 | 0 | *S[3] | [NONE] | [NONE] | [NONE] | [NONE] | [NONE] |
| 6 | XORVAL_32MEM1 | 0 | 0 | 0 | 0 | 0 | 0 | [NONE] | [NONE] | [NONE] | [NONE] | [NONE] |
| 7 | XCHANGE_32 | 0 | 0 | 0 | 0 | 0 | 0 | [NONE] | [NONE] | [NONE] | [NONE] | [NONE] |
| 8 | XCHANGE_32 | 0 | 0 | 0 | 0 | 0 | 0 | [NONE] | [NONE] | [NONE] | [NONE] | [NONE] |
| 9 | XORARRAY32MEM1 | 0 | 0 | 0 | 0 | 0 | *P[0] | [NONE] | [NONE] | [NONE] | [NONE] | [NONE] |
| 10 | XORARRAY32MEM | 0 | 0 | 0 | 0 | 0 | *P[0] | [NONE] | [NONE] | [NONE] | [NONE] | [NONE] |

*Fig. 8*

| UN-VARYDATA PROTOCOL CONTROL RECORD ||||||
|---|---|---|---|---|---|
| PROTOCOL NAME | NUMBITS | NUMFIELDS | PAD DATA | FIELDS | IS_BLOCK |
| UN-VARYDATA PROTOCOL | 64 | 2 | 0 | FIGURE 8a | TRUE |

*Fig. 8a*

| UN-VARYDATA PROTOCOL FIELD SUB-RECORDS |||||||||||
|---|---|---|---|---|---|---|---|---|---|---|
| INDEX | FIELD NAME | BIT OFFSET | BIT LENGTH | LEFT SHIFT | RIGHT SHIFT | OUTPUT BIT OFFSET | OUTPUT LEFT SHIFT | OUTPUT RIGHT SHIFT | VARY STRUCTURE | FILTER STRUCTURE | FORMAT |
| 0 | FIELD 0 | 0 | 0 | 0 | 0 | 0 | 0 | 0 | FIGURE 8b | [NONE] | HEX |
| 1 | FIELD 1 | 32 | 32 | 0 | 0 | 32 | 0 | 0 | [NONE] | [NONE] | HEX |

*Fig. 8b*

| VARYDATA PROTOCOL FIELD 0 VARY OBJECT ARRAY ||||||||||||
|---|---|---|---|---|---|---|---|---|---|---|---|
| INDEX | TYPE | OPERAND | LOOPS | DIRECT | FIRST_IDX | LAST_IDX | BOX | [SHIFT] | [OFFSET] | [IDX] | [IVAL] | [ARRAYB] |
| 0 | LOOP | 0 | 16 | 1 | 1 | 7 | 0 | [NONE] | [NONE] | [NONE] | [NONE] | [NONE] |
| 1 | XORARRAY32MEM | 0 | 0 | 0 | 0 | 0 | *P[0] | [NONE] | [NONE] | [NONE] | [NONE] | [NONE] |
| 2 | XORARRAYCOMPUTE IDXSHIFT_32VAL | 0 | 0 | 0 | 0 | 0 | *S[0] | 24 | [NONE] | [NONE] | [NONE] | [NONE] |
| 3 | ADDARRAY_COMPUTEIDX32VAL | 0 | 0 | 0 | 0 | 0 | *S[1] | 16 | [NONE] | [NONE] | [NONE] | [NONE] |
| 4 | XORARRAY_COMPUTEIDX32VAL | 0 | 0 | 0 | 0 | 0 | *S[2] | 8 | [NONE] | [NONE] | [NONE] | [NONE] |
| 5 | ADDARRAY_COMPUTEIDX32VAL | 0 | 0 | 0 | 0 | 0 | *S[3] | 0 | [NONE] | [NONE] | [NONE] | [NONE] |
| 6 | XORVAL_32MEM1 | 0 | 0 | 0 | 0 | 0 | 0 | [NONE] | [NONE] | [NONE] | [NONE] | [NONE] |
| 7 | XCHANGE_32 | 0 | 0 | 0 | 0 | 0 | 0 | [NONE] | [NONE] | [NONE] | [NONE] | [NONE] |
| 8 | XCHANGE_32 | 0 | 0 | 0 | 0 | 0 | 0 | [NONE] | [NONE] | [NONE] | [NONE] | [NONE] |
| 9 | XORARRAY32MEM1_IDX | 0 | 0 | 0 | 0 | 0 | *P[0] | [NONE] | [NONE] | 1 | [NONE] | [NONE] |
| 10 | XORARRAY32MEM_IDX | 0 | 0 | 0 | 0 | 0 | *P[0] | [NONE] | [NONE] | 0 | [NONE] | [NONE] |

SYSTEMS AND METHODS FOR GENERAL PURPOSE DATA MODIFICATION

PRIORITY INFORMATION

This is a continuation-in-part of application U.S. Ser. No. 09/898,852, filed on Jul. 3, 2001, issued as U.S. Pat. No. 6,493,761, titled SYSTEM AND METHOD FOR DATA PARSING USING A PROTOCOL PARSING ENGINE, and naming Peter D. Baker, et al. as inventors, which is itself a continuation-in-part of application U.S. Ser. No. 09/113,704, filed on Jul. 10, 1998, issued as U.S. Pat. No. 6,266,700, titled NETWORK FILTERING SYSTEM and naming Peter D. Baker et al as inventors, which is itself a continuation of U.S. Ser. No. 09/080,325, filed on May 15, 1998, issued as U.S. Pat. No. 6,000,041, which is itself a continuation of U.S. Ser. No. 08/888,875, filed on Jul. 7, 1997, issued as U.S. Pat. No. 5,781,729, which is itself a continuation of U.S. Ser. No. 08/575,506, filed on Dec. 20, 1995, issued as U.S. Pat. No. 5,793,954. These applications are all hereby incorporated by reference, in their entirety.

COPYRIGHT NOTICE

A portion of the disclosure of this patent document contains material that is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

FIELD OF THE INVENTION

The present invention relates to a general-purpose data modification system and, in particular, a common system and method for modifying any data composed of interrelated data structures similar to the protocols found within network frames.

BACKGROUND

In modem society, there has been an explosion in the amount of data being created, stored, manipulated and transmitted in electronic form. Various tools have been developed which attempt to more efficiently process this sea of data. For example, text data processors are used to manage text documents, image processors process graphical data, mathematics processors process numeric data, and network processors manage network data packets being transmitted across data networks.

These tools each are adapted to recognize various high-level data formats according to the needs of the tool; for example Microsoft Word for text processors, JPEG and GIF for graphics processors, Ethernet and TCP/IP for network processors, etc. However, regardless of the specific high-level format, the underlying electronic data is represented as a series of binary values (0's and 1's). As part of the operations of these various tools, it is sometimes useful to be able to modify some or all of the binary values, according to a pre-defined series of mathematical operations.

Such data modifications may be done, for example, to process a graphic image by performing a color shift. If the binary values represent color data for a collection of pixels of an image, the pixel values may be altered by applying one or more mathematical operations, to generate new pixel values representing a different color or color combination. A simple example of this would be a data modification designed to extract out the "red shift" effect found in an image of an object that is moving away from the camera at high speeds.

Another example is in numeric array processing, where the data represents an array of data to be analyzed, such as sample values from an empirical experiment, or survey data or the like. The data values all need to be analyzed using the same methods. Therefore, the block of data representing the test results is processed by having the same series of mathematical operations performed on each member of the block.

Yet another example is in encoding and decoding data. By applying a pre-defined series of mathematical operations on a data block or stream, the data can be modified to an encoded form. Similarly, by applying either the same or a different series of mathematical operations to an encoded data block, on a data block or stream, the data can be modified to a decoded form.

Various tools have been developed to perform each of these data modification functions. However, these tools tend to be application-specific, and frequently also task-specific. For example, a typical image processor will be adapted to process images of a particular format, and the image processor will be unable to perform numeric array processing or data encoding. Similarly, a data encoder will typically be adapted to encode data according to a particular encoding scheme, and will be unable to perform numeric array processing or image processing.

Additionally, although CPU's available today can execute hundreds of millions or even billions of instructions per second, to achieve the necessary processing rates for some data modification tasks, vendors often must provide dedicated hardware assistance and/or front-end processors with hand-coded assembly language routines. This solution typically requires hardware and/or software modifications whenever changes are made to the number of supported data modification features, schemes, or formats.

Thus, it is desirable to have a configurable data modification capability, with common control logic that: a) is applicable to many different data modification applications and tasks, b) provides field based operations, and c) can be implemented in either hardware or software. By using common control logic, the system can be reconfigured to support the variety of existing data processors, data formats and data modification tasks and to support future data processors, data formats and data modification tasks without the need for hardware or software modifications.

SUMMARY OF THE INVENTION

Embodiments of the present invention are directed to improved systems and methods for modifying any format of data according to any desired mathematical data modification scheme, using programmably configurable data format definitions and data manipulation schemes, controlled by a common control logic. A single logic control module, implemented in either hardware or software, is used to perform a number of data modification functions, such as image processing, array processing, or data encoding. The module is based on one or more programmably configurable data modification protocol descriptions that may be stored in and retrieved from an associated memory.

By using common control logic, meaning a single logic control module, and programmably configurable data modification protocol descriptions, changes can be made to existing data modification protocol descriptions and support for new data modification protocol descriptions can be added to a system entirely through user reconfiguration, without the need for hardware or software system modifications. Thus, those skilled in the art will appreciate that a data modification system in accordance with an embodiment of the present invention may be configured and reconfigured in a highly efficient and cost effective manner to implement numerous data modification functions, such as data encoding, and to accommodate substantial application or task modifications, such as the use of different types of data processors, different data processor versions, or data formats, without requiring substantial system changes.

In a preferred embodiment, the system employs a CPU or other hardware-implemented method as a processing unit for analyzing files in response to selectively programmed data modification requests. The embodiment may be incorporated in a device, including a CPU and a plurality of input devices, storage devices, and output devices wherein files are received from the input devices, stored in the storage devices, processed by the CPU based upon one or more programmably configurable protocol descriptions also stored in the storage devices, and displayed on the output devices. The protocol descriptions may take the form of one or more protocol descriptions for each supported data modification scheme defined therein.

BRIEF DESCRIPTION OF THE DRAWINGS

The accompanying drawings are included to provide a further understanding of embodiments of the invention and together with the Detailed Description, serve to explain the principles of the embodiments disclosed.

FIGS. 4 and 4a are diagrams representing the control record and field sub-records of an Initialize Data protocol description (InitData).

FIGS. 5 and 5a are diagrams representing the control record and field sub-records of an Initialize Permutation Array protocol description (InitParray).

FIGS. 6 and 6a are diagrams representing the control record and field sub-records of an Initialize Substitution Array protocol description (InitSarray).

FIGS. 7 and 7a are diagrams representing the control record and field sub-records of a VaryData protocol description.

FIGS. 8 and 8a are diagrams representing the control record and field sub-records of an Un-varyData protocol description.

FIGS. 4b, 5b, 6b, 7b, and 8b are diagrams representing the vary object arrays associated with field 0 of the respective field sub-records described in FIGS. 4a, 5a, 6a, 7a, and 8a.

DETAILED DESCRIPTION OF THE PREFERRED EMBODIMENTS

The data modification system of an embodiment views data, such as a document or a file, as though it were a data frame. Thus for the purpose of data modifications such as image processing, numerical array processing, or data encoding, the document may be parsed as a stack of programmably defined protocols, just as if the document were a data frame on a computer network. Note that the data modification system can also process data in transition, as on a computer network.

For purposes of discussion, protocol headers typically associated with network data frames may be regarded as data/control structures within data files. Regardless of the transfer media, data transfers between computer devices rely on protocols to perform specific functions to route and control the data transfers. Protocols as a group have a set of characteristics that can be used to describe the protocols. Protocols also have one or more fields, and the fields may have values that are used to determine:

a) length of the protocol—there is at least one length field, unless the protocol is fixed length;

b) length of the frame—there is a field that indicates the length of the frame, measured in units from a fixed position in the frame's protocol stack, unless the protocol has no protocol length field, whereupon the frame length is determined from another protocol in the stack;

c) a field that contains an indicator of the next protocol in the stack, unless the next protocol in the stack never varies;

d) a checksum field that uses an algorithm to compute the checksum of the bytes in the frame from a fixed position in the frame's protocol stack; and e) address fields, which are fields that indicate a source and destination address.

System Architecture

Figure 1:
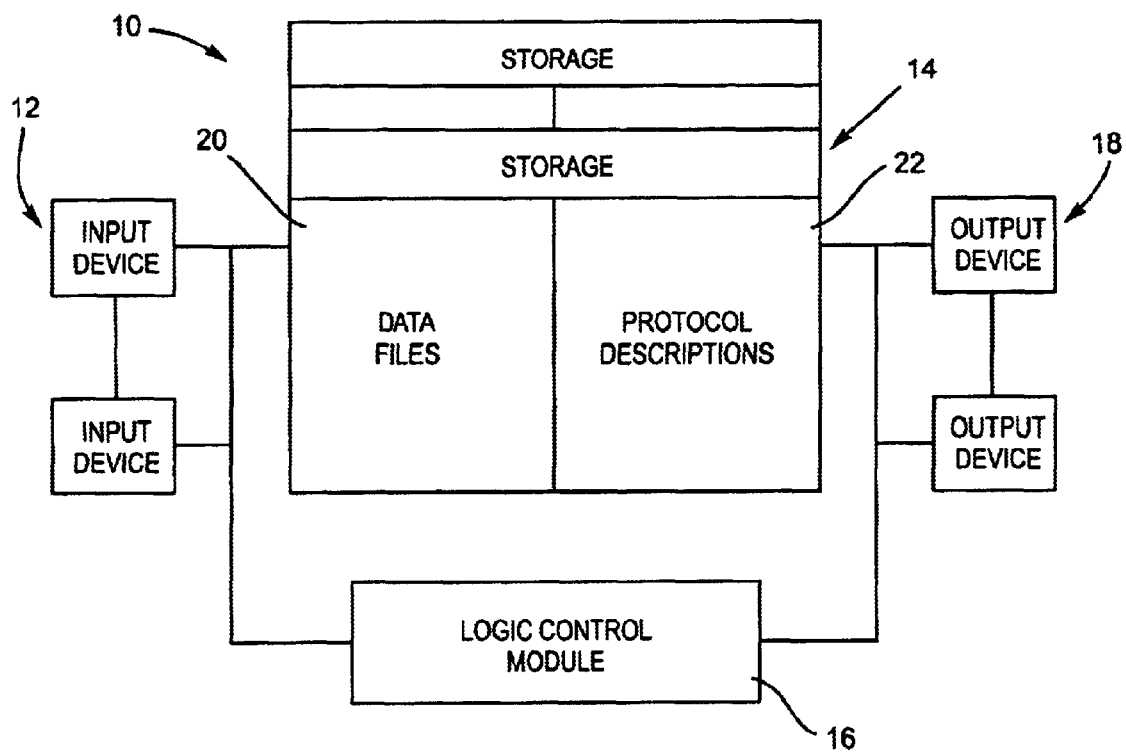
FIG. 1 is a block diagram of an embodiment of a data file modification system.

Referring now to FIG. 1, an embodiment of a data modification system 10 includes input devices 12, data storage devices 14, a logic control module 16 for facilitating the input, storage, retrieval, and analysis of data files, and output devices 18 for displaying or printing the results of the analyses.

Each data storage device 14 of the embodiment of FIG. 1 includes a data file 20 having at least one protocol header record, wherein the protocol header record contains data stored in a plurality of predefined fields. Each data storage device 14 also includes a protocol description 22. Each protocol description 22 includes a protocol control record and at least one field sub-record, which together describe a subset of a protocol and include rules for analysis of the data protocol subset.

The logic control module 16 is capable of retrieving a subset of data from input devices 12 or data files 20 which satisfies one or more criteria based upon extracted field values and filtering criteria contained in one or more of the protocol descriptions 22. The logic control module 16 also includes logic for determining file and protocol header lengths, determining the next protocol, performing data modifications, and controlling data file manipulation based upon the programmably configurable protocol description.

In certain embodiments, a personal computer or other electronic data storage device, such as an IBM PC or compatible, APPLE MACINTOSH, or any UNIX, or XENIX workstation, or similar system is used in the data modification system. (APPLE and MACINTOSH are registered trademarks of Apple Computer, Inc. of Cupertino, Calif. UNIX is a registered trademark of Unix System Laboratories, Inc. of Basking Ridge, N.J. XENIX is a registered trademark of Microsoft Corporation of Redmond, Wash.) In such embodiments, the data input devices 12 include commercially available data input devices, such as keyboards, mice, and trackballs. The data storage devices 14 include commercially available data storage devices such as RAM, ROM, EPROM, or various sized fixed disk drives. The data output devices 18 include commercially available computer I/O devices, such as conventional CRT displays or printers. In certain embodiments, the logic control module 16 is a computer program written in any language suitable for systems programming. In other embodiments, the logic control module 16 is implemented in hardware. Those skilled in the art will appreciate that the logic control module 16 could also be implemented in dedicated hardware using, for example, one or more application specific integrated circuits ("ASICs") or one or more field programmable gate arrays ("FPGAs").

A preferred embodiment of the data modification system 10 is a personal computer, workstation or conventional data manipulation device having a 32-bit or larger bus and register set, a math co-processor, at least 128 megabytes of available RAM, and for personal computer and workstation applications, a fixed disk having at least 1 gigabyte of available storage space. In a preferred embodiment, the logic control module 16 is programmed in the C++ programming language, with abstract data types defined for next protocol determination capabilities, data modification capabilities, display capabilities, and protocol control and field records.

Figure 2:
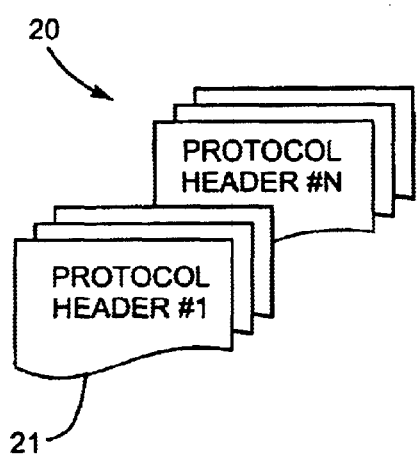
FIG. 2 is a diagram representing a set of data records of a typical data file contained in the data files of the embodiment of FIG. 1.

Referring now to FIG. 2, a data file 20 described in accordance with an embodiment of the invention includes a plurality of protocol header records 21. Each protocol header record 21 contains data organized into a plurality of pre-defined fields. Each field includes a collection of one or more contiguous bits of data and includes a set of allowable values for that field. For example, a particular protocol header record 21 might include a 6-bit header length field and a set of allowable values that limit the protocol header length to values between 20 and 60 inclusive, thereby excluding values less than 20 and values from 61 to 63.

The number of possible contiguous bit fields for a protocol header of length N bits where N is greater than 1 can be expressed by the following formula:

$$\text{Number of Possible Fields} = \sum_{i=1}^{N} i$$

It will be appreciated by those skilled in the art that any possible organization of fields for any possible protocol specification can be used in the data modification system 10.

Figure 3:
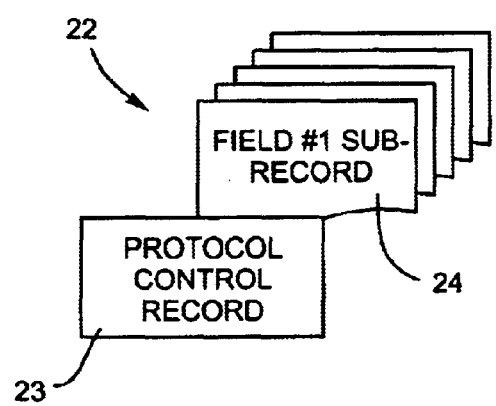
FIG. 3 is a diagram representing an embodiment of the data records of a protocol description.

Referring now to FIG. 3, a protocol description 22 in accordance with an embodiment of the invention includes a protocol control record 23 and a plurality of field sub-records 24. Table 1 shows the data type definitions that are used in Tables 2 through 6. Tables 2 through 6 show the data structures used in a preferred embodiment of a protocol control record 23 and its attendant sub-records. Table 2 shows a preferred embodiment of a protocol control record 23 that defines the overall structure of a data modification protocol and references other information relating to the data modification protocol.

TABLE 1

GENERAL PURPOSE TYPE DEFINITIONS (typedefs) FOR DATA

| | | |
|---|---|---|
| typedef | unsigned char | U8; |
| typedef | char | S8; |
| typedef | unsigned short | U16; |
| typedef | signed short | S16; |
| typedef | unsigned long | U32; |
| typedef | signed long | S32; |
| typedef | unsigned __int64 | U64; |
| typedef | __int64 | S64; |

TABLE 2

PROTOCOL CONTROL RECORD STRUCTURE structure protocol
{

| | | |
|---|---|---|
| U32 | name length; | //Length of protocol name in bytes |
| char | *protocol_name | //Protocol name in ASCII |
| char | *fname; | //File name in ASCII |
| U32 | cur_field; | //Index of last field displayed |
| U32 | out_flag; | //Protocol has been output 'flag' |
| U32 | dbW; | //Display bit width (i.e., #bits per line |
| U64 | occurrences; | //count of instances encountered in parsing |
| U64 | totalbits; | //count of bits encountered in parsing |
| U32 | num_bits; | //# of bits in fixed portion of protocol header |
| U32 | num_fields; | //# of fields used to describe protocol header |
| field | *fs; | //Fields for fixed portion of protocol header |
| protocol | *opts; | //Pointer to protocol for parsing options |
| U32 | include; | //Filter at protocol level |
| U32 | iso_layer; | //1=Baseprotocol, 2=Baseprotocol lookup |
| field | *csum; | //Pointer to protocol checksum field if any |
| field | *flfield; | //Pointer to protocol header length field if any |
| field | *hlfield; | //Pointer to protocol frame length field if any |
| U32 | pswap; | //flag indicating all fields are swapped |
| U32 | pad_data | //data used to pad input to proper length |
| U32 | is_block | //flag indicating data to be processed as a block, rather than a stream |

};

Table 3 shows a preferred embodiment for the organization of the field sub-records referenced by the following item in Table 2:

TABLE 3

FIELD SUB-RECORDS STRUCTURE structure field
{

| | | |
|---|---|---|
| U32 | fplenf; | //flag indicating value is length of file from offset<br>//0 = not a length field<br>//1 = length relative to start of protocol<br>//2 = length relative to start of current field<br>//3 = length relative to start of next field<br>//4 = length relative to start of file |
| U32 | fplenm; | //0: not a length of protocol header field<br>//not 0: multiplier in bits for value in this length field |
| U32 | ffmt; | //Field output display format |
| U32 | flflag; | //multiplier in bits for value in header length field |
| U32 | fmult; | //multiply value by this amount before display |
| protocol | *opt; | //Pointer to protocol for parsing option |
| U32 | fdspfield; | //display this field on output |
| char | *fname; | //user defined field name |
| U32 | fdwoff; | //field offset in bytes |
| field | *hlfield; | //Pointer to field with length for option |
| field | *mult_fld; | //Pointer to field with multiplier for length for option |

TABLE 3-continued

FIELD SUB-RECORDS STRUCTURE

| U16 | mult_idx; | //field index of mult_fld in this protocol |
|---|---|---|
| U8 | fshl; | //Number of bits to shift left |
| U8 | fshr; | //Number of bits to shift right |
| U16 | fblen; | //field length in bits |
| U16 | hl_idx; | //Field index of hlfield in this protocol |
| Checksum | *ptr2csum; | //pointer to checksum class for current protocol |
| criteria | *ptr2flt; | //Pointer to Filter Criteria class for this field |
| lookup | *ptr2np; | //Pointer to derived lookup class (next_potocol) |
| stats | *ptr2stats; | //Pointer to derived statistics class |
| vary | *ptr2vary; | //Pointer to Vary field value Class |
| U32 | DefaultVal; | //Default value for constructing transmit frames |
| U32 | GetMask; | |
| U32 | fldlen_offs; | //flag indicating value is length from offset<br>//0 = not a length field<br>//1 = length relative to start of protocol<br>//2 = length relative to start of current field<br>//3 = length relative to start of next field |
| U32 | ofdwoff | //output field offset in bytes |
| U8 | ofshl; | //output number of bits to shift left |
| U8 | ofshr; | //output number of bits to shift right |
| }; | | |

Table 4 shows a preferred embodiment for the organization of the next_protocol lookup records referenced in Table 3 as:

TABLE 4

LOOKUP STRUCTURE RECORD

```
structure lookup   //the verify structure
{
protocol  *prot;   //pointer to Next Protocol description
U32       nxtidx;  //index of next field in this protocol to parse
U32       minval;  //minimum acceptable value for this range
U32       maxval;  //maximum acceptable value for this range
U32       okbits;  //selects even only, odd only or all values in this range
U32       show;    //flag for display
char      *xlat;   //pointer to associated human language equivalent
};
```

Lookup structures can be used for determining the next field to use, the next protocol control record to use, terminating protocol processing on illegal values, branching decisions for variable length headers or overlapping fields, and converting numeric values to mnemonic or written language equivalents. This ability to specify branches on field values allows specification and dynamic parsing of protocols with multiple overlapping structures.

Any field sub-record in a protocol definition record may have an ordered array of Vary objects associated with it. Table 5 shows a preferred embodiment for the organization of the vary field value records referenced in Table 3 as:

TABLE 5

VARY OBJECT STRUCTURE RECORD

```
structure varyobj
{
U32  doff;     //Offset of field to vary from start of protocol header
U32  mask;     //Mask for extracting bits from EXTRACT_BITSIZE-
               bit value
U32  notmask;  //Mask for clearing bits from EXTRACT_BITSIZE-
               bit value
U32  operand;  //Value to apply to field contents (Relative to field
               bits)
U32  minvalue; //Minimum allowable value for field (Relative to
               field bits)
```

TABLE 5-continued

VARY OBJECT STRUCTURE RECORD

| U32 | maxvalue; | //Maximum allowable value for field (Relative to field bits) |
|---|---|---|
| U32 | loops; | //Loop iterations to execute. 0 if not a loop. |
| | direct; | //Direction: increment or decrement the loop counter. |
| | first_idx; | //First member of the loop, in an array of vary operations |
| | last_idx; | //Last member of the loop, in an array of vary operations. |
| U32 | *array; | //pointer to an S- or P- or Key 'array' or data array |
| void | *Ptr; | //Pointer for use by derived classes (pointer only) |
| }; | | |

The Vary objects, depending on the type of vary being performed, may additionally have one or more of the fields:

| U32 | Shift | //number of bits to shift a value. |
|---|---|---|
| U32 | Offset | //offset of a value to be used. |
| U32 | idx | //index of a value. |
| U8 | ival | //constant 8-bit value |
| U8 | Array8 | //pointer to an array of 8-bit values. |

In Tables 2 through 5 the records of the protocol description and associated field, lookup, and vary records are shown as they appear when resident in memory. In a preferred embodiment, each of these protocol description records with its associated field, lookup, and vary record information is also written to a protocol-specific protocol description file (PDF).

In a preferred embodiment, the following sequence of data is written to a PDF:

For the Protocol Control Record 23:
  a) The length of the of the protocol name including a NULL terminator (name_length),
  b) the name of the protocol (*protocol_name),
  c) the index of the field currently referenced (cur_field),
  d) the display bit width (dbw),
  e) the total bit length of the protocol header (num_bits),
  f) the number of fields used to define the protocol description (num_fields),
  g) for each of the field sub-records that describe the protocol header (*fs), a call is made to write the field related data (This sequence is described below.)
  h) the include protocol flag (include),
  i) the iso_layer flag (iso_layer),
  j) the flag indicating whether the protocol fields are byte swapped (pswap),
  k) the value indicating what sort of pad data will be used (pad_data), e.g. 0 to pad with zeros, 01 to pad with 010101 . . . , 0xf to pad with 1's, 0xff to pad with unchanged junk, etc.
  l) the flag indicating whether the data is to be padded to a specified minimum (bit)width for processing.
  m) if the pointer to the option control record (*opts) is NULL, zero,
  n) if the pointer to the option control record (*opts) is not NULL, meaning that there are options,
    1) the length of the protocol option name including the NULL terminator (name_length),
    2) the option name (*protocol_name),
    3) the rest of the option's protocol control record.
For Each Field Sub-Record 24:

a) the flag indicating if the value is the actual length of the data being parsed (fplenf),
b) the flag indicating if the value is the actual length of the protocol header (fplenm),
c) the number indicating the display type (ffmt),
d) the multiplier to apply to the value in the protocol header length field (flflag),
e) the multiplier to apply to the value prior to display (fmult),
f) the field option name length if any, or zero if there is no option (*opt),
g) the option name if any,
h) the flag indicating that the field is to be displayed (fdspfield),
i) the length of the field name including the NULL terminator (strlen(*fname)+1), or zero,
j) the field name, if any (*fname),
k) the byte offset from the start of the protocol header (fdwoff),
l) the embedded length field index within the field record (hl_idx), or zero,
m) the number of bits to left shift the field (fshl),
n) the number of bits to right shift the field (fshr),
o) the length of the field in bits (fblen),
p) the header length existence flag: zero if *hlfield is NULL, one if *hlfield is not NULL,
q) the header length multiplier existence flag: zero if *mult_fld is NULL, one if *mult_fld is not NULL,
r) the type of check summing, if any (*ptr2csum),
s) if the pointer to the lookup structure/class (*ptr2np) is NULL, zero
t) if the pointer to the lookup structure/class (*ptr2np) is not NULL, a call is made to write the lookup type, the number of lookups, and the lookup values,
u) if the pointer to the statistics structure/class (*ptr2stats) is NULL, zero,
v) if the pointer to the statistics structure/class (*ptr2stats) is not NULL, a call is made to write the number of statistics and each of their statistics type, the pointer to vary field (*ptr2vary) and pointer to filter (*ptr2flt) are handled similarly,
w) the default value for the field (DefaultVal),
x) the flag indicating if the value is a length of the protocol or a field of the protocol (fldlen_offs).
y) The byte offset from the start of the protocol header for the output,
z) The number of bits to left-shift the field before output,
aa) The number of bits to right-shift the field before output.

Common Control Logic

The system of an embodiment of the invention retrieves and parses input data, modifies the data, and outputs the modified data. The retrieval and parsing control logic is in accordance with that described in U.S. Pat. No. 5,781,729, U.S. Pat. No. 5,793,954, and U.S. Pat. No. 6,000,041, which are hereby incorporated herein by reference, in their entirety. The data modification control logic generally comprises a sequence of operations to retrieve or compute a value for the data modification operations, and a sequence of data modification operations to apply to modify the input data. The data modification control logic is discussed in detail below.

Turning now to FIGS. 9–12, the flow charts refer to several variables, which are defined in Table 6 below. These variables are used to keep track of the current control logic state of an embodiment of the present invention:

TABLE 6

| | |
|---|---|
| ParsePtr | Pointer to start of file being parsed |
| HwLen | Bit length of file as reported by operating system |
| block_size | Size of the block of data that vary operations are performed on |
| Len | Size in bits of protocol header being parsed |
| NextProt | Pointer to next protocol in the protocol stack |
| InitData | Pointer to protocol used to initialize the key |
| InitParray | Pointer to protocol used to initialize the permutation array (parray) |
| Initsarray | Pointer to protocol used to initialize the substitution array (sarray) |
| num_Sarray | number of s-arrays configured for the vary algorithm |
| num_Parray | number of p-arrays configured for the vary algorithm |
| size_Parray | size of each p-array, in bytes |
| size_Sarray | size of each s-array, in bytes |
| vary | pointer to vary object array |
| entry_index | loop control variable, for "size_xxx" processing, size_xxx is a user-configured value |
| swap | protocol's user-defined pswap value |
| array_index | loop control variable, for "num_xxx" processing, num_xxx is a user-configured value |
| num_fields | number of fields in the VaryData Protocol |
| num_bytes | number of bytes in a field |
| ParseLen | length of the data that has already been parsed |
| X | pointer to temporary storage array allocated by Parse Fields as size num_fields+1 |
| ptr | pointer to the current position in the data being processed, initially set to ParsePtr (start of data) |
| first | pointer to the first index entry in the loop |
| last | pointer to last index entry in loop |
| loops | number of iterations of the loop to perform |
| arrayidx | Pointer to the s-array or p-array to use in the vary operation |

Figure 9:
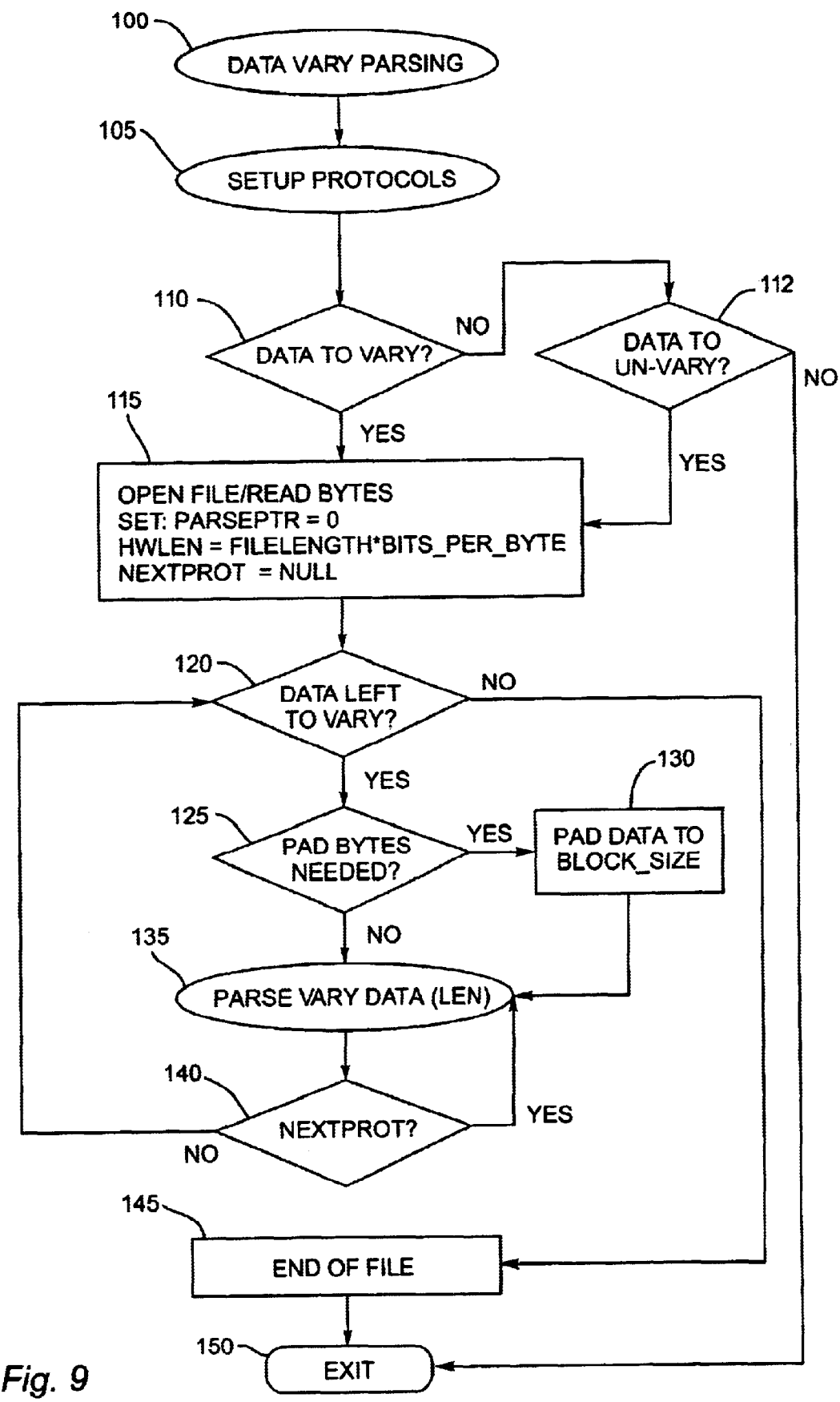
FIG. 9 is a flow chart illustrating the Data Vary Parsing Main Control process.

Turning to FIG. 9, a method of operating a data modification system begins at step 100. This method could be implemented by a stand-alone system for modifying data, or it could be implemented by a component of a larger system, such as the systems for general purpose network analysis described in U.S. Pat. No. 5,781,729, U.S. Pat. No. 5,793, 954, and U.S. Pat. No 6,000,041, or the system for data processing of U.S. Application Ser. No. 09/898,852 now U.S. Pat. No. 6,493,761 . At step 105, configured protocols are received, for example by being retrieved from storage or by being entered by a user, etc., and the protocols are used to initialize the data modification system for processing data. The initialization process is diagramed in FIG. 10 & 10a, and is discussed in detail below. At step 110, the input data to be modified is received, for example by being retrieved from storage or by being entered by a user, etc. If there is no data to be modified, then at step 112, the modified data to be unmodified is received. If there is no data to be un-modified, then at step 150 the data modification method terminates.

Assuming that there is data to be modified or unmodified, then at step 115 the data is read and various system variables are initialized. The data may be read into the system in its entirety before processing begins, or the system may read in the data in a piecemeal fashion and process the parts as they are read in. The variable pointing to the data (ParsePtr) is set to the beginning of the data, the variable containing the total count of data bits to be varied (HwLen) is set to the byte length of the data times the number of bits per byte (e.g. eight).

The main data processing loop begins at step 120, where a check is made to see if there is any data remaining to be modified (or unmodified). Assuming that there is data remaining to be modified, then at step 125 a check is made to see if the data should be padded to conform to a configured minimum size of data to be modified. For example, the system may be configured such that data will be modified in 128-byte blocks. If the incoming data block is smaller than 128 bytes, the incoming data block should be padded with additional bytes of data until it is 128 bytes long. If data padding is indicated, then at step 130 the data is padded, using pad bits configured by a user, or using default pad bits (e.g. pad with zeros, pad with ones, pad with a pre-defined repeating sequence of values, etc.). Once the padding decision has been resolved, then at step 135 the data block is modified according to the current data modification protocol, beginning with the user-defined BaseProtocol in the protocol stack (based on a setting of the iso_layer flag). Once the data block has been modified according to the current data modification protocol, then at step 140 a check is made to see if there is a next data modification protocols to apply to the data block. If there is, then this protocol is selected as the new current data modification protocol, and the data block is further modified according to the current data modification protocol at step 135. The data block modification process of step 135 is discussed in detail below, with reference to FIG. 11. Once the data block has been modified according to all configured data modification protocols, then control returns to step 120, where the next data block is selected for modification (or un-modification). Once all data blocks have been processed, then control passes to step 145, and at step 150 where the input data file or data stream is closed Finally at step 150 the method terminates.

Figure 10:
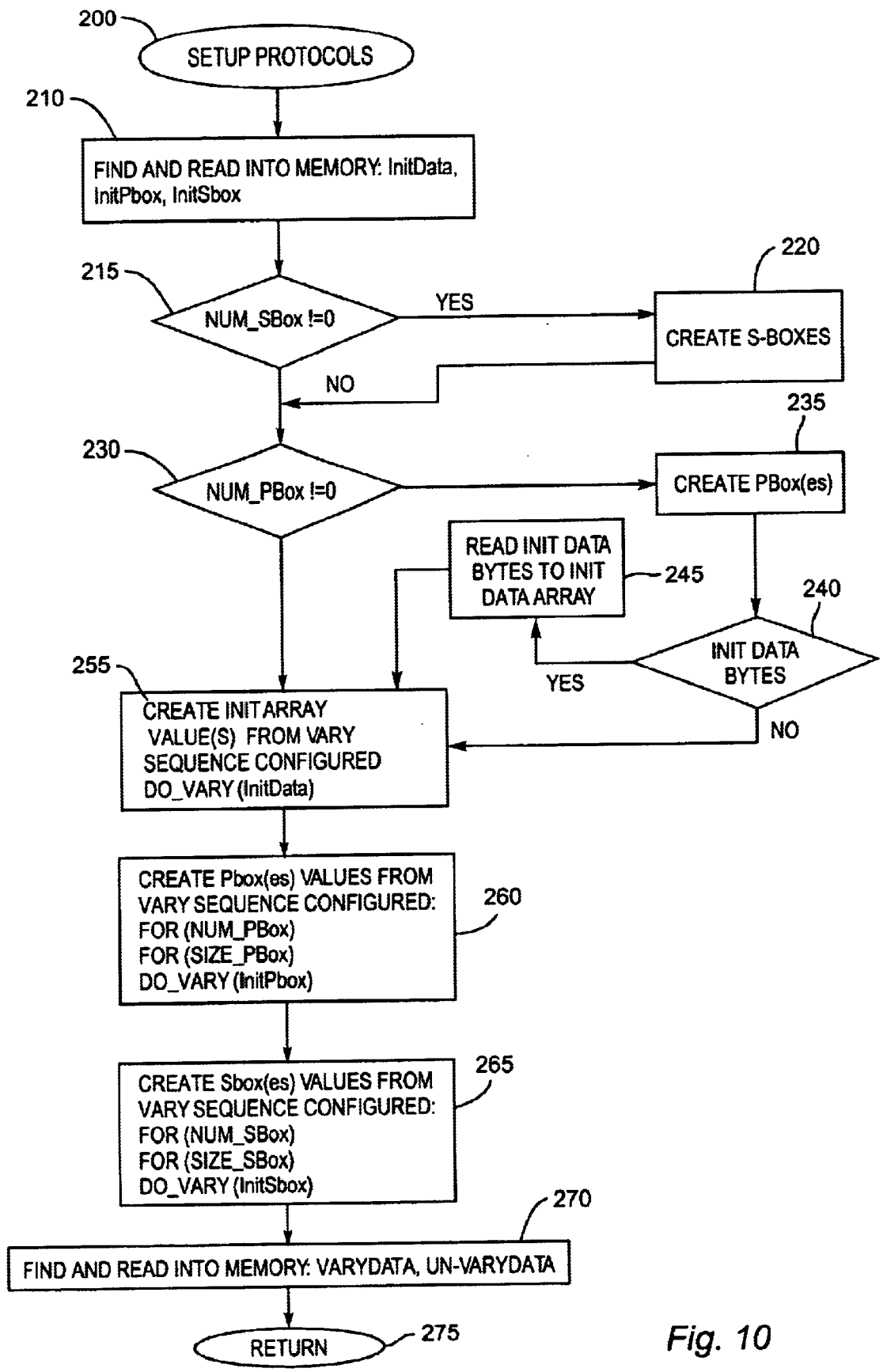
FIG. 10 is a flow chart illustrating the Setup Protocols process.

The protocol setup discussed at step 105 is performed according to the method of FIG. 10. At step 200, the protocol setup process commences. At step 210, the user configured protocols for initializing the system are located and read into memory. For example, protocols to initialize data array, protocols to initialize permutation arrays (p-arrays) and protocols to initialize substitution arrays (s-arrays) are all loaded into memory. Additionally, user configured values indicating the number of configured p-arrays and s-arrays are retrieved. If the number of s-arrays configured is not zero at step 215, then at step 220 memory is allocated for the s-array structure and the initial s-array values are received, for example by retrieving the s-array values from a configuration file for the data modification system, or by retrieving the s-array values from a secondary file identified in the configuration file, or by providing a system-specified default value (e.g. zero) for the s-array values. Alternatively the user could enter values from a console, paper tape, any input media or electronic storage device. At step 230, if the number of p-arrays configured is not zero, then at step 235 memory is allocated for the p-array structure and the initial p-array values are received in the same manner as discussed above for s-arrays. At step 240, a check is made to determine if initialization data has been configured for the system. If the number of initialization data bytes is not zero, then at step 245 memory is allocated to store the initialization data, and the initial initialization data value is read into the initialization data array, in the same manner as discussed above for s-arrays and p-arrays.

For many of the vary value operations performed on user data being varied, the user may wish to specify (numeric) inputs. The initialization array, P-array and S-arrays provide a method of specifying and computing (and storing new values for) these inputs. The vary data function uses user-specified inputs manipulated in a user specified sequence to generate input values for a variety of operations to be performed on the data to be varied.

An initialization array is an initial user-specified input value of user-specified width that can be varied (manipulated) using a sequence of user specified operations to produce values to be used as input(s) to vary value operations. Its use here in the example is described in the InitData and InitParray setup discussion below.

Iinput data can be varied by spreading the bits out over the output data by transposing or permuting bits, sometimes compressing or expanding the size of the input data in the output data. In the example cited herein, a permutation array is used as an initial user-specified input array (of user specified size) of values of user-specified width that can be varied (manipulated) using a sequence of user-specified operations to produce values to be used as input(s) to vary value operations that result in the (expanded or compressed) permutation of data bits.

A substitution array is an initial user-specified input array (of user-specified size) of values of user-specified width that can be varied (manipulated) using a sequence of user specified operations to produce values to be used as input(s) to vary value operations that perform substitutions on data. The substitution is a mapping of some m-bit input to some n-bit output. The values and the size and number of values the user specifies for input are all design choices for the user.

Figure 10A:
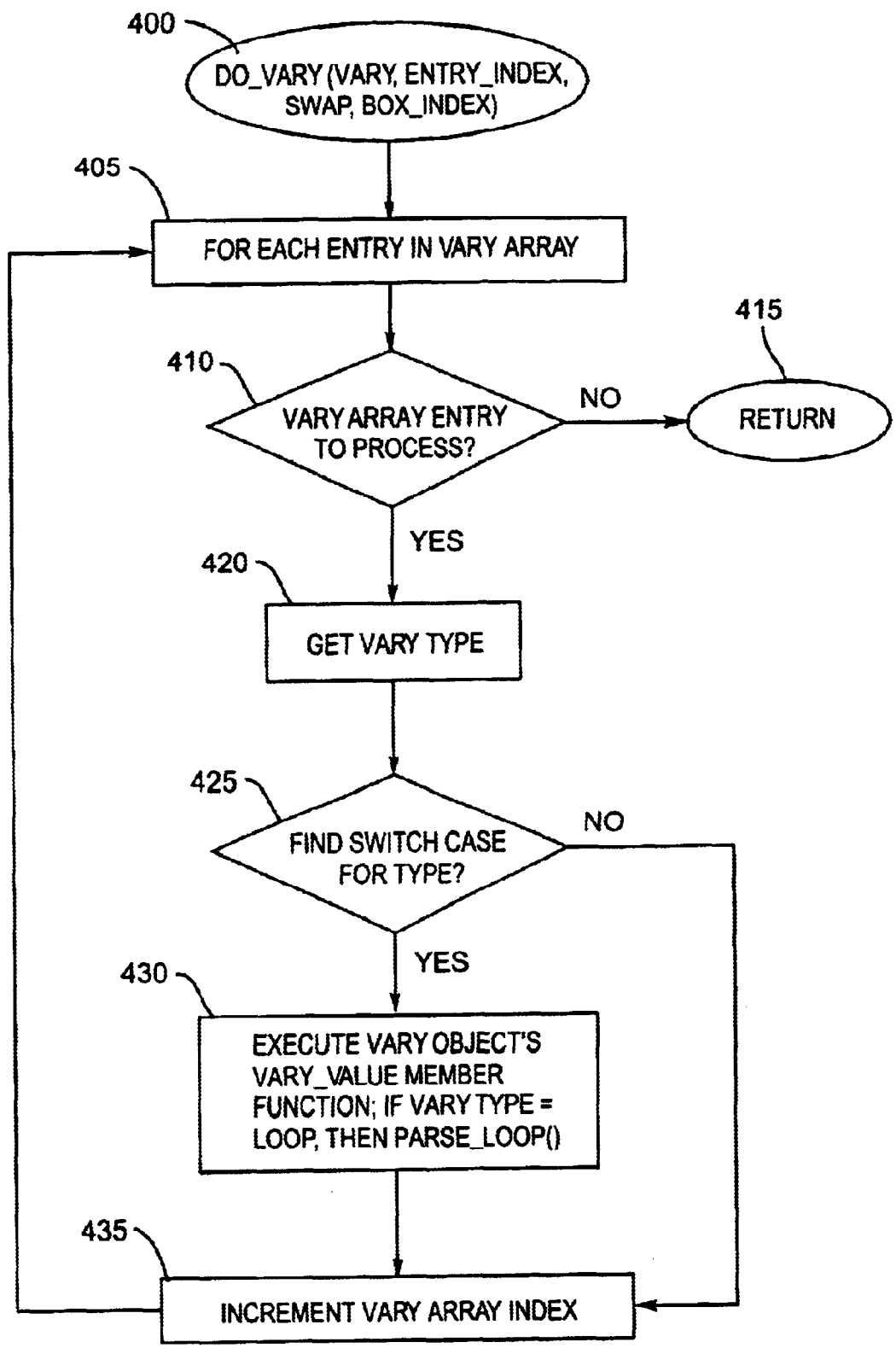
FIG. 10a is a flow chart illustrating the Do Vary process for the Setup Protocols process.

If configured for an initialize array, the array is allocated and configured initial data for this array, if any, is set in the array. Then at step 255 the initialization array values (or a default value if there is no initial data configured) are modified according to the configured data modification sequence (if any) for initializing this array (InitData). The modification method of FIG. 10*a* is used to change the initialization array values which may be applied to the data to be modified. This method is discussed in detail below.

Once any initialization data has been modified, then at step 260, if the configured number of p-arrays is not zero, then the p-array values are created using the InitParray protocol, any user input p-array data and any initialization array data as applied to the key values created at step 255. The InitParray protocol is used as configured for each segment of each p-array configured for the system. The modification method of FIG. 10*a* is used to modify the initial p-array values and produce a p-array value array, which may be applied to the data to be modified.

Once any configured p-arrays have been created and modified, then at step 265, if the configured number of s-arrays is not zero, then the s-array values are created using configured input values, if any, and any s-array, p-array, and initialization array data from steps 255 and 260. The Init-Sarray protocol is used as configured for each segment of each s-array configured for the system. The modification method of FIG. 10*a* is used to modify the initial s-array values and produce a s-array value array, which will be applied to the data to be modified. 100631 Once any configured p-arrays and s-arrays have been created and modified, then at step 270 the protocols which will be used to modify the input data, such as VaryProtocol and UnVaryProtocol, are read into memory. Then at step 275, control is returned to the main control method at step 105.

Any initialization array, s-array and p-array values are modified according to the method of FIG. 10*a*, to produce initialization array, s-array and p-array values. The method is entered at step 400, where the variables used in processing the values are received from the calling step of the method of FIG. 10. At step 405, the vary object array entries for the protocol being processed (e.g., InitData, InitParray and InitSarray) are executed in sequence beginning with entry 0. At step 410, a check is made to determine if there are any vary array entries to be processed. If there are no varies to be processed, then all vary array entries have been processed and the method terminates at step 415, returning control to the calling step of the method of FIG. 10. If there is a vary to be processed, then at step 420, the vary type array entry is read and the vary type is retrieved. A list of defined vary types is searched, to locate the processing method to use for the indicated vary type, at step 425. If the indicated vary type is not found in the list, then control passes to step 435. If the indicated vary type is found in the list, then at step 430 the corresponding processing method is executed on the input data. At step 435, the next entry in the vary array is selected, and control passes back to step 405 where the remaining entries are processed. Once all entries are processed, then at step 415 the method terminates, returning control back to the calling step of the method of FIG. 10.

Figure 11:
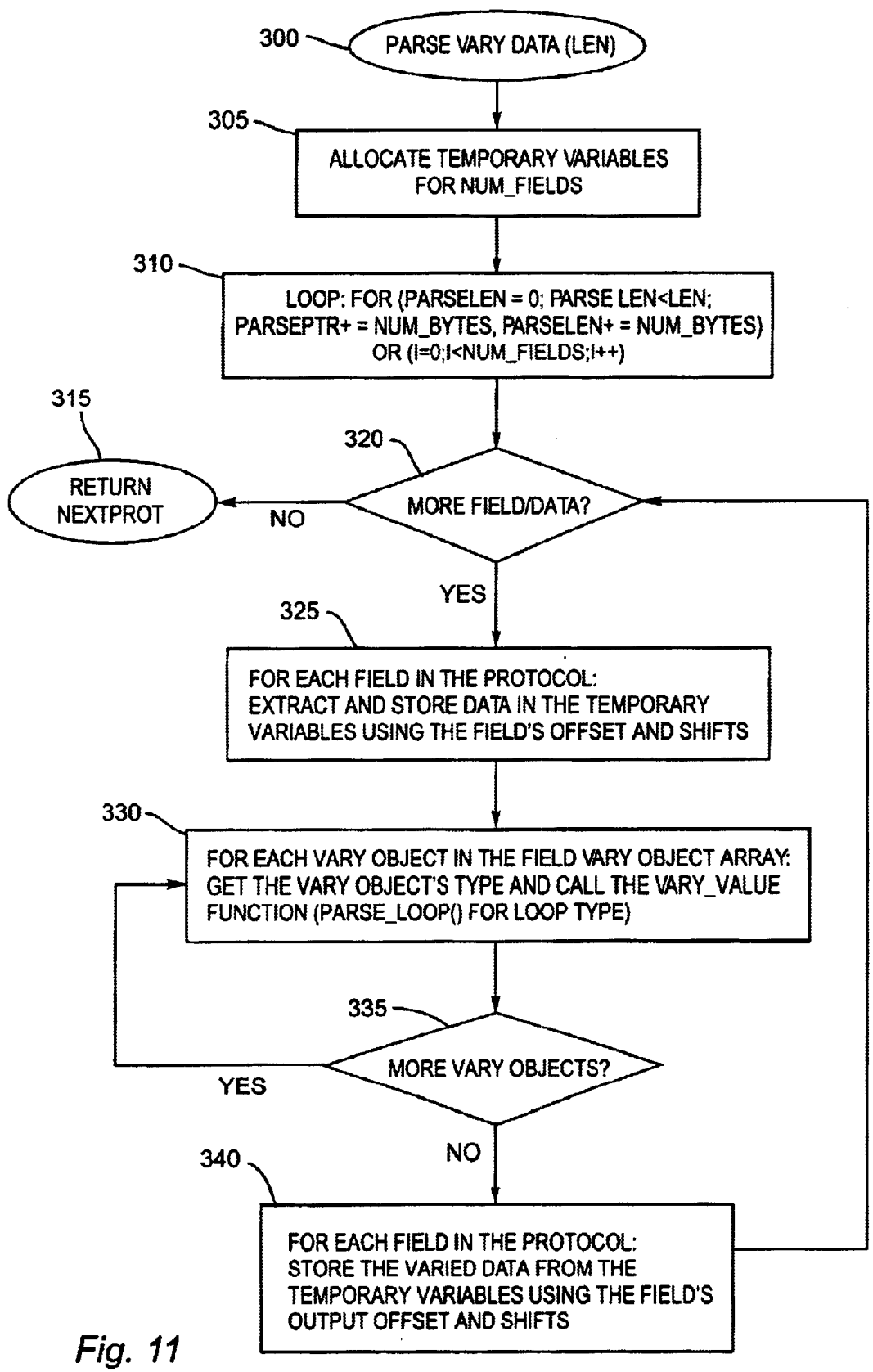
FIG. 11 is a flow chart illustrating the Parse Vary Data Fields process.

The data modification process of step 135 is performed according to the method of FIG. 11. At step 300, the process begins by receiving a pointer to the data modification protocol to be used to modify the data and a value (Len) which is a pointer for the protocol's header length (in bits). At step 305, temporary variables are allocated to accommodate data for the number of fields in the data modification protocol to be parsed (e.g. X[0], X[1] for the two fields of the VaryData protocol of FIG. 7). These temporary variables will hold intermediate values while the data is being modified.

The main processing loop is then entered at step 310, where the loop is executed while the length of data already parsed (ParseLen) is less than the value (Len), the protocol's header length, and there are fields remaining to be processed (i=0; i<num_fields;i++) Thus, each iteration of the loop, the data modification protocol parses one or more fields, as defined in the data modification protocol, and then increments the ParseLen counter by the amount of data parsed. When the ParseLen counter equals or exceeds the Len value or all protocol fields have been processed, then at step 320, the loop ceases and a pointer to the next data modification protocol, if any, to be applied is returned to step 140 of FIG. 9, since either all the data or all the protocol fields have been parsed. A pointer (ParsePtr) is also maintained, which points to the next byte of data to be parsed. Each iteration of the loop, this pointer is incremented by the amount of data parsed by the data modification protocol in the current iteration, as defined in the data modification protocol.

At step 325, the data to be modified is extracted from the incoming data block or data stream and stored in the temporary field variables created above, using the Bit Offset, Bit Length, Left Shift and Right Shift values defined in the field sub-records for the data modification protocol.

Once the data has been loaded into the temporary variables, then at step 330 the vary object operations configured for the data modification protocol's fields are performed. Table 7 below contains a list of the vary object operation Types and associated vary_value member functions for this example embodiment. Beginning with the first vary object operation in the vary object array of the data modification protocol, the vary object Type value is extracted from the array. This value is used to determine the proper vary_value member function to call, to perform the vary object operation. Vary value member functions of the VARY_LOOP type are treated specially, as discussed below. Once the data is modified according to the vary_value member function, or the VARY_LOOP is completed, then at step 335 a check is made to determine if there are any remaining unprocessed vary objects in the vary object array. If there are, then the next vary object is identified and processed at step 330. Once all vary objects have been processed, then at step 340, the varied data stored in the temporary variables created above is output, using the Output Bit Offset, Output Left Shift, and Output Right Shift. Control then returns to step 320, where the next field of the protocol is used to extract the next subset of the data which is to be modified according to the vary object array for that field of the current data modification protocol. Once all of the protocol's fields have been processed or all the data has been modified, then control returns to step 140 of FIG. 9, where the next data modification protocol is accessed for modification of the data.

Turning to Table 7, each vary_value member function implements a data modification operation, such as a position swap, an XOR, an addition, or other such operations. For sake of clarity, the examples in Table 7 are described generally, since the specific programming implementations of the member functions are design choices for those skilled in the art, and are not critical to the disclosed embodiments of the invention.

TABLE 7

| | |
|---|---|
| 1. VARY_XORVAL_32MEM1 | Exclusive OR the 32-bit value at the input pointer plus one with an input 32-bit value |
| 2. VARY_XORARRAY32MEM | Exclusive OR the 32-bit value at the input pointer plus input offset with a value from an array at the input index |
| 3. VARY_XORARRAY32MEM | Exclusive OR the 32-bit value at the input pointer plus input offset plus 1 with a value from an array at the input index |
| 4. VARY_ARRAYCOMPUTEIDXSHIFT_32VAL | Retrieve the value from an array at the index computed by shifting the 32-bit value at the input pointer right a specified number of bits. |
| 5. VARY_ADDARRAY_COMPUTEIDX32VAL | Add the value at array index computed from the value at the input pointer shifted right a specific number of bits to the value at the input pointer, and add an input value to that result. |
| 6. VARY_XORARRAY_COMPUTEIDX32VAL | Retrieve the value from an array at the index computed by shifting the value at the input pointer right a specified number of bits. Exclusive OR this value with a 32-bit input operand. |
| 7. VARY_XCHANGE_32 | Exchange the 32-bit value at the input pointer with the 32-bit input value; return the original value at the input pointer. |
| 8. VARY_XORARRAY32MEM_IDX | Exclusive OR the 32-bit value at the input pointer plus the input offset with the 32-bit value from a specific array index. |
| 9. VARY_XORARRAY32MEM1_IDX | Exclusive OR the 32-bit value at the input pointer plus the input offset plus one with the 32-bit value from a specific |

TABLE 7-continued

| | | |
|---|---|---|
| 10. | VARY_SETINIT1_32 | array index<br>Initialize with a specific 32-bit value |
| 11. | VARY_SETINIT2_32 | Initialize with a specific 32-bit value |
| 12. | VARY_SETARRAYIDX_32 | Set a 32-bit value at an array index at an input offset |
| 13. | VARY_SETARRAYIDX1_32 | Set a 32-bit input value at an array index at an input offset plus one |
| 14. | VARY_SETARRAYIDXXOR_32 | Exclusive OR a 32-bit value at an input pointer with a 32-bit value in an array at an input index and store the resulting value at the array index |
| 15. | VARY_SETINIT_8 | Retrieve an 8-bit value |
| 16. | VARY_INCMOD_8 | Increment an 8-bit input value an input modulo |
| 17. | VARY_ORARRAY8_SHIFTVAL_32 | OR a value from an array of 8-bit values at an input array index with a value at an input pointer shifted a set number of bits in a set direction |
| 18. | VARY_LOOP | Sets up variables and calls parse_loop or parse_loop_neg to execute iterative execution of the configured vary object entries. Details discussed in FIG. 12 and accompanying text. |

Figure 12:
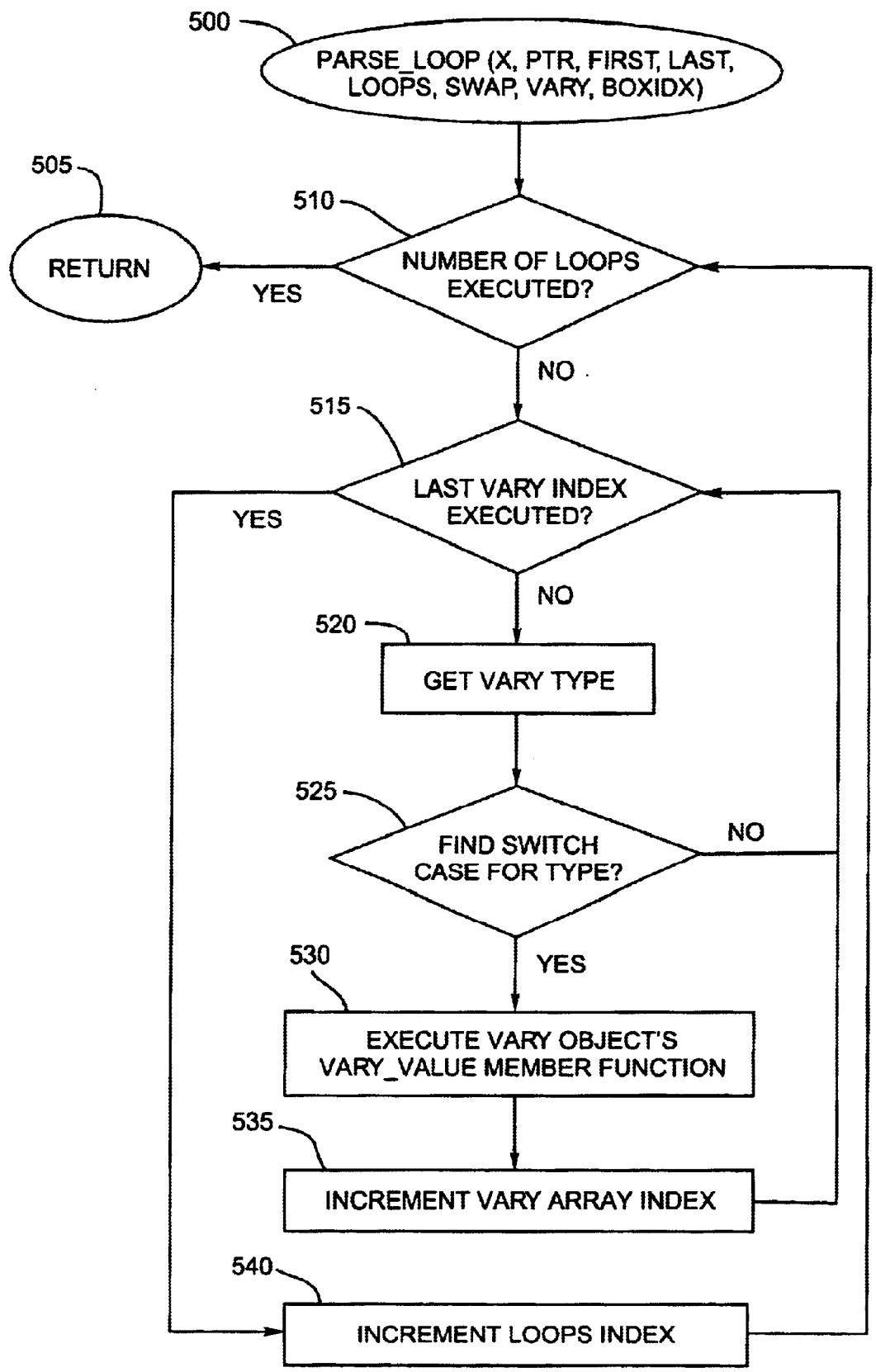
FIG. 12 is a flow chart illustrating the Parse Loop process used in the Setup Protocols and Parse Vary Data Fields processes.

Turning to FIG. 12, The parse_loop process called by the vary_value member function VARY_LOOP begins at step 500, where the values for the various variables used in processing the loop are received. The values used at step 500 are shown in Table 8.

TABLE 8

| | |
|---|---|
| X | pointer to the X[0] etc. array of temporary variables |
| Ptr | current data pointer position |
| First | first_idx from the vary object |
| Last | last_idx from the vary object |
| Loops | loops from the vary object (where vary object direct=1: loop from last_idx to first_idx, direct=0: loop from first_idx to last_idx) |
| Swap | protocol's pswap configuration |
| Vary | vary object array pointer |
| Arrayidx | the index of the array being initialized |

Once the variables are initialized, then at step 510 the number of completed loop iterations is compared with the number of configured loop iterations (loops), to determine if the loop is complete. Assuming the loop has not been completed, then at step 515 the index value for current vary_object array element being processed (Vary) is compared with the index of the final element in the loop (Last), to determine if the current loop iteration is complete. Assuming that the current loop iteration has not been completed, then at step 520 the vary object Type is retrieved from the current loop element. At step 530, the collection of vary_value member functions is searched to locate the member function corresponding to the Type. If there is no member function corresponding to the Type, then processing is skipped and control returns to step 515 for processing of the next vary_object array element. Otherwise the corresponding member function is retrieved and executed, at step 530. Note that if the member function here is itself a VARY_LOOP member function (i.e. a nested loop configuration), then the parse_loop process is recursively called to process the nested loop. Once the vary_value member function is executed, then at step 535 the index value for the current vary_object array element being processed is incremented to point to the next element in the array, and control returns to step 515 to determine if the current iteration has been completed.

Once the current iteration has been completed, then at step 540 the processed loops counter is incremented, and control returns to step 510 to determine if all configured iterations of the loop have been processed. Once all configured iterations of the loop have been processed, then at step 505 the parseloop method terminates, returning control to step 335 of FIG. 11, where the next vary object array element after the end of the loop is processed.

Example Protocols

Turning to FIGS. 4–7, a collection of example protocols for use with embodiments of the invention are disclosed. FIG. 4 is an InitData protocol, used in the data initialization discussed at step 250 of FIG. 10. The protocol is titled "Init_Data_Protocol" (ProtocolName). The protocol has one field (NumFields). The protocol will use "0" characters to pad the key data if it is shorter than 32 bits (Pad_data). The protocol has the field sub-record of FIG. 4a. The protocol will process the data as a data block, rather than a data stream (Is_block).

FIG. 4a is the field sub-record of the protocol of FIG. 4. The field has a name of "Field 0" (Field Name). The field begins at bit offset 0 from the start of the protocol header (BitOffset). The field is 32 bits long (Bit Length). The field shift values are both "0", so the field will not be shifted either left or right (Left Shift, Right Shift). The data value in the field will be varied according to the vary structures of FIG. 4b (Vary Structure).

FIG. 4b is the vary_object array for the InitData protocol. This is the sequence of data modification operations that will be performed on the initial data value, to generate the data used in configuring the common control logic of the data modification system. The vary_object array contains seven entries, shown with indexes 0–6 (Index). Each entry has a vary object type, which corresponds to one of the member functions in Table 8 above (Type). Each entry has an operand value that is used by certain of the member functions to modify the data in the field (operand). Not all member functions will use the operand value. The entries that define data modification loops each have a value specifying how many loop iterations to perform (loops), which direction the loop counter will go, incremented or decremented (direct), which vary_object array entry is the first entry in the loop (first_idx), and which vary_object array entry is the last entry in the loop (last_idx). Shift type operations may also use the direction value to specify whether to shift data bits left or right. Each entry contains a pointer (or "0") to an S-array, P-array, or initial data array for use with the entry. Entries which perform shift operations contain a value indicating how many bits to shift (Shift). Certain entries contain a field indicating an offset value, which is specific to the type of vary object, as discussed in Table 7 above. The FIGS. 4b–7b items with headers in brackets are fields that exist only in some of the types of vary objects (that is, [shift], [offset], [idx], [ival], and [array8]). The [None] in the FIGS for these entries indicate the absence of the item. The functions of the individual entries of the vary_object array are discussed in detail below.

FIG. 5 is an InitParray protocol, used in the initialization of the P-array discussed at step 260 of FIG. 10. The InitParray protocol, InitParray field sub-records of FIG. 5*a*, and InitParray vary_object array of FIG. 5*b* are organized in the same manner as the InitData, InitData field sub-records and InitData vary_object array of FIGS. 4–4*b*. Similarly, turning to FIGS. 6–6*b*, the InitSarray protocol, InitSarray field sub-records of FIG. 6*a*, and InitSarray vary_object array of FIG. 6*b* are organized in the same manner as the InitData, InitData field sub-records and InitData vary object array of FIGS. 4–4*b*.

The VaryData and UnVaryData protocols of FIGS. 7–7*b* and 8–8*b* are organized similarly to the protocols of FIGS. 4–6 discussed above. The VaryData and UnVaryData protocols each have two fields of 32 bits configured (NumFields). There are two field sub-records, one of which begins at bit 0 of the protocol header (Bit Offset="0"), the other which begins at the $32^{nd}$ bit of the protocol header (Bit Offset="32"). Similarly, the output fields begin at Bit Offset=0 and Bit Offset=32.

An example of the operation of the data modification system will now be discussed, using the common control logic of FIGS. 9–12, as configured by the data modification protocols of FIGS. 4–8, and applied to the system configuration file data shown in Table 9 and input data shown in Table 10 below. The initial data values, P-array values, S-array values, and input data are all expressed in hexadecimal notation.

TABLE 9

Initial Data Size: 5 bytes
Initial Data Value: 41 41 41 41 41
Initial Number of P-Arrays: 1
Initial Number of S-Arrays: 4

TABLE 10

Input Data:

| 00000000 | 00000001 | 00000002 | 00000003 | 00000004 |
| 00000005 | 00000006 | 00000007 | 00000008 | 00000009 |

Operation of the system begins at step 100. At step 105 the configured protocols of FIGS. 4–8 are retrieved. Control passes to the protocol setup method of FIG. 10, where the configuration file values for the initial data, number of P-arrays and number of S-arrays are read into the system at step 210. Since the number of S-arrays configured is 4 at step 215, four S-arrays are created at step 220, initialized with initial S-array values defined in the configuration file. The initial S-array values are not shown, in the interests of brevity and clarity. The specific values are design choices for the user and are not critical to the invention. Next at step 215, since the number of P-arrays is 1, one P-array is created at step 235, initialized to all zeros as defined in the configuration file. At step 240, since the initial key size is 5, then at step 245 the initial key value is read from the configuration file.

At step 255, using the InitKey protocol of FIG. 4, the vary object operations configured for the protocol are performed. In the example: FIG. 4 shows a protocol with a single 32-bit field record. The field record (in FIG. 4*a*) has an array of seven vary object structures listed in FIG. 4*b*. Referring to the FIG. 4*b* vary object sequence, the FIG. 10*a* flowchart and the List of vary_value member functions for the vary objects configured (Table 8), the vary object processing sequence is:

0. An 8-bit variable is initialized to 0 (Table 8, #15).
1. A loop is setup to execute the vary objects two through six sequentially 18 times (Table 8, #18).

The following vary objects vary_value member functions are executed in this loop (2–6):

2. A 32-bit variable is initialized to 0 (Table 8, #10).
3. A loop is setup to execute the vary objects four and five sequentially four times (Table 8, #18).

The following vary objects are executed in this loop (4–5):

4. The 32-bit variable is shifted left 8-bits and bit-wise OR'd with the value in the configured array (key) at the loop index entry passed to the vary_value function (Table 8, #17).
5. The value from vary object 4 above is incremented modulo key_bytes (Table 8, #16).
6. The value from vary object 5 above is XOR'd with the configured array (the P-array) at the loop index entry and assigned to that entry (Table 8, #15).

When the InitKey protocol has completed processing the initial key value, the initial 5 byte value 41 41 41 41 41 has been modified and output to the array of eighteen 32-bit P-array values shown in Table 11 below:

TABLE 11

41414141, 41414141, 41414141, 41414141, 41414141, 41414141
41414141, 41414141, 41414141, 41414141, 41414141, 41414141
41414141, 41414141, 41414141, 41414141, 41414141, 41414141

Control then proceeds to step 260, where the InitParray protocol is used to configure the P-array values based on the initialized P-array of Table 11. In the example: FIG. 5: shows a protocol with a single 32-bit field record. The field record (in FIG. 5*a*) has an array of fifteen vary object structures listed in FIG. 5*b*. Referring to the FIG. 5*b* vary object sequence, the FIG. 10*a* flowchart and the List of vary_value member functions for the vary objects configured (Table 8), the vary object processing sequence is:

0. A 32-bit variable (X[0]) is initialized to 0 (Table 8, #10).
1. A second 32-bit variable (X[1]) is initialized to 0 (Table 8, #11).
2. A loop is setup to execute the vary objects three through nine sequentially 16 times (Table 8, #18).

The following vary objects vary_value member functions are executed in this loop (3–9):

3. Variable X[0] is XOR'd with the P-array entry at the loop variable index (Table 8, #2).
4. The value in S-array [0] at the index determined by shifting the value in X[0] right 24 bits and ANDing it with 0xff is retrieved (Table 8, #4).
5. The value from vary object 4 above is added to the value in S-array[1] at the index determined by shifting the value in X[0] right 16 bits and ANDing it with 0xff (Table 8, #5).
6. The value from vary object 5 above is XOR'd with the value in S-array[2] at the index determined by shifting the value in X[0] right eight bits and ANDing it with 0xff (Table 8, #6).
7. The value from vary object 6 above is added to the value in S-array[3] at the index determined by ANDing the value in X[0] with 0xff (Table 8, #5).
8. The value from vary object 7 above is XOR'd with the value in X[1] (Table 8, #1).
9. The values in variables X[0] and X[1] are exchanged with each other (Table 8, #7).
10. The values in variables X[0] and X[1] are exchanged with each other (Table 8, #7).
11. The value in X[1] is XOR'd with the value in the P-array entry at index 16 (Table 8, #2).

12. The value in X[0] is XOR'd with the value in the P-array entry at index 17 (Table 8, #3).
13. The value in X[0] is set in P-array at the loop index entry (Table 8, 12).
14. The value in X[1] is set in P-array at the loop index entry plus one (Table 8, 13).

When the InitParray protocol has completed processing the initial P-array values, the initial values of Table 11 have been modified to the array of eighteen 32-bit P-array values shown in Table 12 below:

TABLE 12

| | | | | | |
|---|---|---|---|---|---|
| d989a376, | 37ef62db, | 68107089, | 2915fdfd, | bca6019f, | 82ad3c00 |
| 122fe99e, | 8271e77b, | 2480c56c, | a2f655e3, | bbc69ec9, | 16bfc3df |
| d53af984, | 7ba76776, | f4d97944, | d8678dcc, | 6052bfa0, | 44d51991 |

Control then proceeds to step 270, where the InitSarray protocol is used to configure the S-array values. The do_vary method of FIG. 10a is called for each configured entry-increment of each S-array.

Procedure do_vary is called 128 times for each of the five S-arrays, setting up two 32-bit entries of the 256-entries of one of the five S-arrays in each call (variable array idx refers to the S-array being updated).

Using the InitSarray protocol, the vary object operations configured for the field(s) in the protocol are performed (at 265). In the example: FIG. 6 shows a protocol with a single 32-bit field record. The field record (in FIG. 6a) has an array of thirteen vary object structures listed in FIG. 6b. Referring to the FIG. 6b vary object sequence, the FIG. 10a flowchart and the List of vary_value member functions for the vary objects configured (Table 8), the vary object processing sequence is:

0. A loop is setup to execute the vary objects one through seven sequentially 16 times (Table 8, #18).

The following vary objects vary_value member functions are executed in this loop (1–7):

1. Variable X[0] is XOR'd with the P-array entry at the loop variable index (Table 8, #2).
2. The value in S-array[0] at the index determined by shifting the value in X[0] right 24 bits and ANDing it with 0xff is retrieved (Table 8, #4).
3. The value from vary object 2 above is added to the value in S-array[1] at the index determined by shifting the value in X[0] right 16 bits and ANDing it with 0xff (Table 8, #5).
4. The value from vary object 3 above is XOR'd with the value in S-array[2] at the index determined by shifting the value in X[0] right eight bits and ANDing it with 0xff (Table 8, #6).
5. The value from vary object 4 above is added to the value in S-array[3] at the index determined by ANDing the value in X[0] with 0xff (Table 8, #5).
6. The value from vary object 5 above is XOR'd with the value in X[1] (Table 8, #1).
7. The values in variables X[0] and X[1] are exchanged with each other (Table 8, #7).
8. The values in variables X[0] and X[1] are exchanged with each other (Table 8, #7).
9. The value in X[1] is XOR'd with the value in the P-array entry at index 16 (Table 8, #2).
10. The value in X[0] is XOR'd with the value in the P-array entry at index 17 (Table 8, #3).
11. The value in X[0] is set in S-array[arrayidx] at the loop index entry (Table 8, 12).
12. The value in X[1] is set in S-array[arrayidx] at the loop index entry plus one (Table 8, 13).

Once the P-arrays and S-arrays have been initialized, then at step 270 the VaryData, Un-Vary Data and any associated protocols for either are read into memory. Once initialization is complete, then control returns to the main control loop at step 105 of FIG. 9. At step 110, the input data of Table 10 is read into memory, and at step 115, the system variables are initialized. ParsePtr is set to 0, to point to the beginning of the data. Since there are 320 bytes of data (10 words at 32 bytes each) and 8 bits per byte, HwLen is set to 320*8=2560. At step 120, the length of the data to process (input data of FIG. 10) is compared with the length of data already processed to determine if processing should continue. At step 125, it is confirmed that the data block does not need padding, since it is not shorter than the NumBits value of the VaryData. protocol. At step 135, control passes to the parse_vary_data method of FIG. 11. For this example, NumBits for the protocol is 64, there are no associated protocols. Data from the input file is processed by each protocol one protocol field at a time. Processing begins with the data at ParsePtr plus the offset configured for field[0] of the protocol.

Turning to FIG. 11, at step 305 the VaryData protocol is examined to determine the temporary variables to be created. Since there are two fields defined (NumFields=2), two temporary variables X[0] and X[1] are created to hold the data being modified. X[0] and X[1] are 32 bit variables, allocated to each contain a field of the data to be modified. At step 310, the main processing loop is initialized. The loop iterates through the data of Table 10, until all the protocol fields have been parsed, as indicated when i=num_fields or the value ParseLen equals or exceeds the value Len. Each iteration through the loop, ParsePtr and ParseLen are incremented by the length of the field being parsed. At step 320, a check is made to determine if there are more fields remaining to be processed, which check is confirmed.

At step 325, the offset and shift fields of the VaryData protocol are used to extract the data values from the input data to be modified, and the data values are stored in X[0] and X[1]. For the first pass through the loop, since ParsePtr=0 and the Bit Offset for field 0 from the VaryData Protocol Field Sub-Record is 0 and the Bit Length is 32, X[0] is loaded with the first 32 bits of the input data. Similarly, since the Bit Offset for field 1 from the VaryData Protocol Field Sub-Record is 32 and the Bit Length is 32, X[1] is loaded with the next 32 bits of the input data.

Using the VaryData protocol, the vary object operations configured for the field(s) in the protocol are performed, at step 330. In the example: The field zero sub-record (in FIG. 7a) has an array of eleven vary object structures listed in FIG. 7b. Referring to the FIG. 7b vary object sequence, the FIG. 10a flowchart and the list of vary_value member functions for the vary objects configured (Table 8), the vary object processing sequence is:

0. A loop is setup to execute the vary objects one through seven sequentially 16 times (Table 8, #18).

The following vary objects vary_value member functions are executed in this loop (1–7):

1. The value in X[0] is XOR'd with the value in the P-array entry at the loop variable index (Table 8, #2).
2. The value in S-array[0] at the index determined by shifting the value in X[0] right 24 bits and ANDing it with 0xff is retrieved (Table 8, #4).
3. The value from vary object 2 above is added to the value in S-array[1] at the index determined by shifting the value in X[0] right 16 bits and ANDing it with 0xff (Table 8, #5).
4. The value from vary object 3 above is XOR'd with the value in S-array[2] at the index determined by shifting the value in X[0] right eight bits and ANDing it with 0xff (Table 8, #6).

5. The value from vary object 4 above is added to the value in S-array[3] at the index determined by ANDing the value in X[0] with 0xff (Table 8, #5).
6. The value from vary object 5 above is XOR'd with the value in X[1] (Table 8, #1).
7. The values in variables X[0] and X[1] are exchanged with each other (Table 8, #7).
8. The values in variables X[0] and X[1] are exchanged with each other (Table 8, #7).
9. The value in X[1] is XOR'd with the value in the P-array entry at index 16 (Table 8, #2).
10. The value in X[0] is XOR'd with the value in the P-array entry at index 17 (Table 8, #3).

When all vary objects have been executed, at step 335, then at step 340, the varied data values in the temporary variables X[0] and X[1] are output, using the VaryData Protocol values configured for Output Offset, Output Left Shift, Output Right Shift for each field in the Protocol. Thus the varied data in X[0] is output to the first 32 bits of the storage location, since the Output Bit Offset for field 0 is 0. The varied data in X[1] is output to the next 32 bits of the storage location, since the Output Bit Offset for field 1 is 32. Control returns to step 320, where it is determined that all protocol fields have been processed (i=num_fields). At step 315, a pointer to NULL is returned to step 140 of FIG. 9, since there is no next_protocol defined to be applied to the input data. Returning to FIG. 9, at step 140 the NULL pointer is recognized as indicating that there are no more data modification protocols to be parsed for the current data block, so control returns to step 120 where it is determined that there is data left to vary, and the process is repeated on the next 64 bits of data. When there is no more data left to process, control passes to step 145, where any cleanup processing may be performed. The method then terminates at step 150. The final results of performing the VaryData Protocol processing on the input data is shown below in Table 15.

TABLE 15

| | | | | |
|---|---|---|---|---|
| 776f5a15, | 33817850, | a80d3931, | 7c88e16f, | a0d6fa99, |
| 304cabec, | 591864df, | 3bc5947b, | a9340601, | fcc420c5, |

An example of un-varying data according to an embodiment of the invention will now be discussed. The varied data of Table 15 is un-varied in a substantially similar manner as discussed above for the example of varying data. The Initial Data Array, S-Arrays, and P-Array are set up the same as for varying data. The Un-VaryData Protocol is read in as discussed above. At step 112 of FIG. 9, the existence of data to un-vary is recognized, and at step 115, the input data file is read in as discussed above. The first data block to un-vary is identified at step 120. No pad bytes are needed (step 125), so at step 135 the parse_vary_data procedure is entered.

Turning to FIG. 11, at step 305 the Un-VaryData protocol is examined to determine the temporary variables to be created. Since there are two fields defined (NumFields=2), two temporary variables X[0] and X[1] are created to hold the data being modified. X[0] and X[1] are 32 bit variables, allocated to each contain a field of the data to be modified. At step 310, the main processing loop is initialized. The loop iterates through the data of Table 10, until all the protocol fields have been parsed, as indicated when I=num_fields or the value ParseLen equals or exceeds the value Len. Each iteration through the loop, ParsePtr and ParseLen are incremented by the length of the field being parsed. At step 320, a check is made to determine if there are more fields remaining to be processed, which check is confirmed.

At step 325, the offset and shift fields of the Un-VaryData protocol are used to extract the data values from the input data to be modified, and the data values are stored in X[0] and X[1]. For the first pass through the loop, since ParsePtr=0 and the Bit Offset for field 0 from the Un-VaryData Protocol Field Sub-Record is 0 and the Bit Length is 32, X[0] is loaded with the first 32 bits of the input data. Similarly, since the Bit Offset for field 1 from the Un-VaryData Protocol Field Sub-Record is 32 and the Bit Length is 32, X[1] is loaded with the next 32 bits of the input data.

Using the Un-varyData protocol, the vary object operations configured for the field(s) in the protocol are performed (at 330). In the example: The field zero sub-record (in FIG. 8*a*) has an array of eleven vary object structures listed in FIG. 8*b*. Referring to the FIG. 8*b* vary object sequence, the FIG. 10*a* flowchart and the list of vary_value member functions for the vary objects configured, (Table 8) the un-vary object processing sequence is:

0. A decrementing index loop is setup to execute the vary objects one through seven sequentially 16 times (Table 8, #18).

The following vary objects vary_value member functions are executed in this loop (1–7):

1. The value in X[0] is XOR'd with the value in the P-array entry at the loop variable index (Table 8, #2).
2. The value in S-array[0] at the index determined by shifting the value in X[0] right 24 bits and ANDing it with 0xff is retrieved (Table 8, #4).
3. The value from vary object 2 above is added to the value in S-array[1] at the index determined by shifting the value in X[0] right 16 bits and ANDing it with 0xff (Table 8, #5).
4. The value from vary object 3 above is XOR'd with the value in S-array[2] at the index determined by shifting the value in X[0] right eight bits and ANDing it with 0xff (Table 8, #6).
5. The value from vary object 4 above is added to the value in S-array[3] at the index determined by ANDing the value in X[0] with 0xff (Table 8, #5).
6. The value from vary object 5 above is XOR'd with the value in X[1] (Table 8, #1).
7. The values in variables X[0] and X[1] are exchanged with each other (Table 8, #7).
8. The values in variables X[0] and X[1] are exchanged with each other (Table 8, #7).
9. The value in X[1] is XOR'd with the value in the P-array entry at index 1 (Table 8, #9).
10. The value in X[0] is XOR'd with the value in the P-array entry at index 0 (Table 8, #8).

When all un-vary objects have been executed, at step 335, then at step 340, the un-varied data values in the temporary variables X[0] and X[1] are output, using the Un-VaryData Protocol values configured for Output Offset, Output Left Shift, Output Right Shift for each field in the Protocol. Thus the un-varied data in X[0] is output to the first 32 bits of the storage location, since the Output Bit Offset for field 0 is 0. The un-varied data in X[1] is output to the next 32 bits of the storage location, since the Output Bit Offset for field 1 is 32. Control returns to step 320, where it is determined that all protocol fields have been processed (i=num_fields). At step 315, a pointer to NULL is returned to step 140 of FIG. 9, since there is no next_protocol defined to be applied to the input data. Returning to FIG. 9, at step 140 the NULL pointer is recognized as indicating that there are no more data modification protocols to be parsed for the current data block, so control returns to step 120 where it is determined that there is data left to vary, and the process is repeated on the next 64 bits of data. When there is no more data left to process, control passes to step 145, where any cleanup processing may be performed. The method then terminates at step 150. The final results of performing the Un-VaryData Protocol processing on the varied data of Table 15 is shown below in Table 16.

TABLE 16

| 00000000 | 00000001 | 00000002 | 00000003 | 00000004 |
|----------|----------|----------|----------|----------|
| 00000005 | 00000006 | 00000007 | 00000008 | 00000009 |

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense, and the invention is not to be restricted or limited except in accordance with the following claims and their legal equivalents.

We claim:

1. A method for modifying data according to configurable criteria, comprising:

storing a plurality of programmably configurable protocol descriptions, the programmably configurable protocol descriptions, the programmably configurable protocol descriptions each including a protocol control record and at least one field sub-record for defining at least one data modification;

storing a program for controlling a data modification function to be executed by a processing unit, the program including instructions for causing the processing unit to selectively retrieve the at least one programmably configurable protocol description and to vary the execution of the data modification function based upon the at least one retrieved protocol description;

delivering to the processing unit the program for controlling the data modification function;

delivering to the processing unit the data; and enabling the processing unit to execute the data modification function.

2. A system for manipulating data files, the system comprising:

a logic control module capable of accessing a plurality of programmably configurable protocol descriptions stored in a data storage device, the programmably configurable protocol descriptions each including a protocol control record and at least one field sub-record for defining a data manipulation to be performed and;

the logic control module including file and protocol header length determination logic, next protocol determination logic, and logic for controlling, based upon the programmably configurable protocol description, one or more data manipulation functions to be implemented by the system.

3. A machine implemented process for modifying data according to programmably configurable criteria, the process comprising the steps of:

storing at least one programmably configurable protocol description file in a data storage device, the at least one programmably configurable protocol description file comprising a protocol control record and at least one field sub-record for defining a plurality of modification rules;

retrieving the at least one protocol description from the data storage device; and providing the at least one protocol description to a logic control module configured such that upon receiving the at least one protocol description, the logic control module modifies data based upon the modification rules defined by the protocol description.

4. The process of claim 3, wherein a plurality of programmably configurable protocol descriptions are stored in the data storage device, and wherein the programmably configurable protocol descriptions are selectively retrieved from the data storage device in response to selected data sequences.

5. A method of modifying input data comprising:

receiving the input data;

providing a common control logic module;

providing a protocol description including a data modification function;

configuring the common control logic module to perform the data modification function, using the protocol description;

modifying the input data using the data modification function; and outputting the modified input data.

6. The method of claim 5, wherein modifying the input data comprises applying a plurality of mathematical operations to the input data.

7. The method of claim 5, wherein configuring the common control logic module comprises creating a permutation array.

8. The method of claim 7, wherein creating a permutation array comprises modifying an initial input value to create an initial permutation array, and modifying the initial permutation array to create a modified permutation array.

9. The method of claim 8, wherein modifying the initial input value and modifying the initial permutation array each comprises performing a plurality of mathematical operations.

10. The method of claim 5, wherein configuring the common control logic module comprises creating a substitution array.

11. The method of claim 10, wherein creating a substitution array comprises retrieving initial input array values to create an initial substitution array, and modifying the initial substitution array to create a modified substitution array.

12. The method of claim 11, wherein modifying the initial substitution array comprises performing a plurality of mathematical operations.

13. The method of claim 5, wherein configuring the common control logic module comprises creating an initial data value.

14. The method of claim 13, wherein the initial data value comprises an array.

15. The method of claim 13, wherein creating an initial data value comprises modifying an initial input value.

16. The method of claim 15, wherein modifying an initial input value comprises performing a plurality of mathematical operations on the initial input value.

17. The method of claim 5, wherein configuring the common control logic module comprises loading an input data modification protocol.

18. The method of claim 17, wherein the input data modification protocol comprises a vary protocol.

19. The method of claim 17, wherein the input data modification protocol comprises an un-vary protocol adapted to restore modified input data to an unmodified state.

20. The method of claim 5, wherein the protocol description comprises a protocol control record and a field sub-record and the field sub-record includes the data manipulation function.

21. A computer program product that includes a medium useable by a processor, the medium having stored thereon a sequence of instructions which, when executed by said processor, causes said processor to execute a method of modifying input data, the method comprising:

receiving the input data;

providing a common control logic module;

providing a protocol description including a data modification function;

configuring the common control logic module to perform the data modification function, using the protocol description;

modifying the input data using the data modification function; and outputting the modified input data.

22. The computer program product of claim 21, wherein the protocol description comprises a protocol control record and at least one field sub-record for defining a data manipulation to be performed.

23. A system for modifying input data, comprising:

a common control logic module adapted to:
receive the input data;
receive a protocol description including a data modification function;
perform the data modification function, using the protocol description;
modify the input data using the data modification function; and
output the modified input data;

a storage device adapted to store a protocol description and provide the protocol description to the common control logic module; and an input data receiver module adapted to receive input data and provide the input data to the common control logic module.

24. The system of claim 23, wherein the protocol description comprises a protocol control record and at least one field sub-record for defining a data manipulation to be performed.

* * * * *